US012725621B2

(12) United States Patent
Baumgarte et al.

(10) Patent No.: US 12,725,621 B2
(45) **Date of Patent: *Sep. 1, 2026**

(54) METHOD AND SYSTEM FOR ENCODING LOUDNESS METADATA OF AUDIO COMPONENTS

(71) Applicant: Apple Inc., Cupertino, CA (US)

(72) Inventors: Frank Baumgarte, Sunnyvale, CA (US); Dipanjan Sen, Dublin, CA (US)

(73) Assignee: Apple Inc., Cupertino, CA (US)

( * ) Notice: Subject to any disclaimer, the term of this patent is extended or adjusted under 35 U.S.C. 154(b) by 102 days.

This patent is subject to a terminal disclaimer.

(21) Appl. No.: 18/471,199

(22) Filed: Sep. 20, 2023

(65) Prior Publication Data

US 2024/0105196 A1 Mar. 28, 2024

Related U.S. Application Data

(60) Provisional application No. 63/376,736, filed on Sep. 22, 2022.

(51) Int. Cl.
*G10L 19/16* (2013.01)
*G10L 19/008* (2013.01)
(Continued)

(52) U.S. Cl.
CPC .......... *G10L 19/167* (2013.01); *G10L 19/008* (2013.01); *G10L 25/51* (2013.01);
(Continued)

(58) Field of Classification Search
CPC ..... G10L 19/167; G10L 19/008; G10L 25/51; G10L 21/034; H04S 7/30; H04S 2400/11; H04S 2400/13
See application file for complete search history.

(56) References Cited

U.S. PATENT DOCUMENTS 9,559,651 B2 1/2017 Baumgarte et al.
9,576,585 B2 2/2017 Bleidt
(Continued)

FOREIGN PATENT DOCUMENTS

CN 106170992 B 12/2019
JP 2008-505586 2/2008
(Continued)

OTHER PUBLICATIONS

Dolby, "Dolby Metadata Guide", Dolby Laboratories, Inc, Issue 3, received from https://www.dolby.com/uploadedFiles/Assets/US/Doc/Professional/18_Metadata.Guide.pdf, 2005, 28 pages.
(Continued)

*Primary Examiner* — Michael Colucci
(74) *Attorney, Agent, or Firm* — Aikin & Gallant, LLP

(57) ABSTRACT

A method that includes receiving an audio component associated with an audio scene, the audio component including an audio signal, determining a loudness level of the audio component based on the audio signal, receiving a target loudness level for the audio component, producing a bitstream with the audio component by encoding the audio signal and including metadata that has the loudness level and the target loudness level, and transmitting the bitstream to an electronic device.

19 Claims, 9 Drawing Sheets

(51) Int. Cl.
*G10L 25/51* (2013.01)
*H04S 7/00* (2006.01)

(52) U.S. Cl.
CPC ............ *H04S 7/30* (2013.01); *H04S 2400/11* (2013.01); *H04S 2400/13* (2013.01)

(56) References Cited

U.S. PATENT DOCUMENTS

| | | | | |
|---|---|---|---|---|
| 9,607,624 | B2 | 3/2017 | Baumgarte | |
| 9,608,588 | B2 | 3/2017 | Baumgarte | |
| 10,063,207 | B2 | 8/2018 | Malak et al. | |
| 10,083,088 | B1 * | 9/2018 | Beeken | G06F 11/1451 |
| 10,109,288 | B2 | 10/2018 | Baumgarte | |
| 10,453,463 | B2 | 10/2019 | Baumgarte | |
| 12,190,901 | B2 * | 1/2025 | Deruty | G10L 25/21 |
| 12,328,439 | B2 * | 6/2025 | Cao | H04N 19/136 |
| 2004/0260869 | A1 * | 12/2004 | Factor | G06F 3/0683 711/112 |
| 2007/0291959 | A1 | 12/2007 | Seefeldt | |
| 2014/0044291 | A1 * | 2/2014 | Xia | H04R 25/552 381/321 |
| 2014/0294200 | A1 | 10/2014 | Baumgarte et al. | |
| 2014/0297291 | A1 | 10/2014 | Baumgarte | |
| 2014/0344526 | A1 * | 11/2014 | Brown | G06F 11/1458 711/141 |
| 2015/0332685 | A1 | 11/2015 | Bleidt | |
| 2015/0363160 | A1 * | 12/2015 | Riedmiller | H04R 29/00 700/94 |
| 2017/0032793 | A1 | 2/2017 | Baumgarte | |
| 2017/0094409 | A1 | 3/2017 | Baumgarte | |
| 2018/0068666 | A1 * | 3/2018 | Riedmiller | G10L 19/008 |
| 2018/0143799 | A1 | 5/2018 | Küch et al. | |
| 2018/0233158 | A1 * | 8/2018 | Ray | G10L 21/0208 |
| 2018/0262849 | A1 * | 9/2018 | Farmani | H04R 25/407 |
| 2019/0222188 | A1 * | 7/2019 | Tsuchida | H04R 3/04 |
| 2020/0267472 | A1 * | 8/2020 | McElveen | H04R 3/005 |
| 2021/0191687 | A1 * | 6/2021 | Latina | G06F 3/165 |
| 2022/0377484 | A1 * | 11/2022 | Terentiv | H04S 3/02 |
| 2023/0224667 | A1 * | 7/2023 | Rodman | H03G 3/3089 381/303 |
| 2024/0105195 | A1 * | 3/2024 | Baumgarte | G10L 19/008 |

FOREIGN PATENT DOCUMENTS

| | | |
|---|---|---|
| JP | 2017-534903 | 11/2017 |
| JP | 2018-522286 | 8/2018 |
| JP | 6838093 B2 | 3/2021 |
| WO | 2015038475 A1 | 3/2015 |

OTHER PUBLICATIONS

International Standard, "Information technology—MPEG audio technologies—Part 4: Dynamic range control," ISO/IEC 23003-4 Second Edition, Jun. 2020, pp. i-v, 75-81, 136-138, 158-160, 205-207, and 243.

"Algorithms to measure audio programme loudness and true-peak audio level," International Telecommunication Union ITU-R Radiocommunication Sector of ITU, Recommendation Itu-R BS.1770-4, Oct. 2015, 25 pages.

* cited by examiner

| | |
|---|---|
| loudnessInfoSetV8() { | |
| **loudnessInfoAlbumCount**; | 8 uimsbf |
| **loudnessInfoTrackCount**; | 8 uimsbf |
| for (i=0; i<loudnessInfoAlbumCount; i++) { | |
| loudnessInfoV8(); | |
| } | |
| for (i=0; i<loudnessInfoTrackCount; i++) { | |
| loudnessInfoV8(); | |
| } | |
| if (**loudnessInfoOfSourcesPresent**) { | 1 bslbf |
| loudnessInfoOfSources(); | |
| } | |
| if (**loudnessInfoSetSceneExtPresent**==1) { | 1 bslbf |
| loudnessInfoSetSceneExtension(); | |
| } | |
| } | |

**Table 1: Syntax of *loudnessInfoSetV8()* Payload**

FIG. 7

```
loudnessInfoOfSources() {
  if (hasOneChannelGroupWithAllChannels==1) {            1 bslbf
    channelGroupCount = 1;
    startChannelIndex = 0;
    channelCount = baseChannelCount;
  }
  else {
    channelGroupCount;                                   8 uimsbf
  }
  for (k=0; k<channelGroupCount; k++) {
    if (hasOneChannelGroupWithAllChannels == 0) {
      startChannelIndex;                                 8 uimsbf
      channelCount;                                      8 uimsbf
      if (moreClusters==1) {                             1 bslbf
        additionalClusterCount;                          8 uimsbf
        for (k=0; k<additionalClusterCount; k++) {
          startChannelIndex;                             8 uimsbf
          channelCount;                                  8 uimsbf
        }
      }
    }
    if (sourceLoudnessPresent==1) {                      1 bslbf
      bsSourceLoudness;                                  8 uimsbf
      if (productionLoudnessTargetPresent==1) {          1 bslbf
        bsProductionLoudnessTarget;                      8 uimsbf
      }
    }
  }
}
```

**Table 2: Syntax of *loudnessInfoOfSources()* Payload**

FIG. 8

METHOD AND SYSTEM FOR ENCODING LOUDNESS METADATA OF AUDIO COMPONENTS

RELATED APPLICATIONS

This application claims the benefit of priority of U.S. Provisional Application No. 63/376,736 filed Sep. 22, 2022, which is herein incorporated by reference.

FIELD

An aspect of the disclosure relates to a system that includes an encoder that produces a bitstream that has encoded audio content of an audio scene, and includes loudness metadata associated with the audio content, which a decoder uses to control loudness of the audio scene. Other aspects are also described.

BACKGROUND

Many devices today provide users with the ability to stream media content such as a sound program that may include music, a podcast, a live recorded short video clip, or a feature film over the Internet. For example, a playback device, such as a digital media player that may be electronically coupled (or a part of) an output device, such as a speaker, and may be configured to stream content for playback through the speaker. This content may be selected by users (e.g., through a graphical user interface of the playback device), and streamed from one or more content providers that provide the content on a subscription basis.

SUMMARY

An aspect of the disclosure is an encoder side method, which may be performed by an electronic device (e.g., a media content device), for encoding audio content and metadata that describes one or more loudness levels of the audio content into one or more (e.g., audio) bitstreams. The encoder side receives an audio component associated with an audio scene, the audio component comprising an audio signal, determines a source loudness of the audio component based on the audio signal receives a target loudness for the audio component; produces a bitstream with the audio component by encoding the audio signal and including metadata that has the source loudness and the target loudness; and transmits the bitstream to an electronic device.

In one aspect, the audio signal is a portion of an entire audio signal that makes up the audio component, wherein the source loudness is an average loudness across the portion of the entire audio signal that is received. In another aspect, the portion is a first portion, and the source loudness is a first source loudness, wherein the method further comprises: receiving a second portion of the entire audio signal that is received after the first portion; determining a second source loudness based on the first and second portion; and transmitting the second source loudness as metadata in the bitstream that includes an encoded second portion of the entire audio signal. In one aspect, the second portion of the entire audio signal may be subsequent to the first portion. In some aspects, the second source loudness converges closer or is equal to an overall loudness of the entire audio signal than the first source loudness. In one aspect, determining the source loudness comprises retrieving the source loudness from memory, wherein the source loudness is an overall loudness that spans the length of the audio signal. In another aspect, determining the source loudness of the audio component comprises applying the audio signal to a loudness model.

In one aspect, determining an audio scene loudness for the audio scene based on the source loudness of the audio component and the target loudness, wherein the audio scene loudness is included in the metadata. In another aspect, determining the audio scene loudness includes determining a scalar gain based on a difference between the target loudness and the source loudness; and producing a gain-adjusted audio signal by applying the scalar gain to the audio signal, wherein the audio scene loudness is determined using the gain-adjusted audio signal.

In one aspect, the audio component is a first audio component, the audio signal is a first audio signal, the source loudness is a first source loudness, and the target loudness is a first target loudness, wherein the method further comprises: receiving a second audio component associated with the audio scene, the second audio component comprising a second audio signal; determining a second source loudness for the second audio component based on the second audio signal; and receiving a second target loudness for the second audio component, wherein the bitstream is produced with the first audio component and the second audio component, along with the first source loudness, the second source loudness, the first target loudness, and the second target loudness as the metadata. In another aspect, the first target loudness is different than the second target loudness. In another aspect, the first target loudness and the second target loudness are the same. In some aspects, the scalar gain is a first scalar gain, wherein the method further comprising: producing a first gain-adjusted audio signal by applying the first scalar gain to the first audio signal, wherein the first scalar gain is based on a difference between the first target loudness and the first source loudness; producing a second gain-adjusted audio signal by applying a second scalar gain to the second audio signal, wherein the second scalar gain is based on a difference between the second target loudness and the second source loudness; determining an audio scene loudness level for the audio scene based on the first gain-adjusted audio signal and the second gain-adjusted audio signal, and adding the audio scene loudness level to the metadata.

In one aspect, producing the bitstream comprises converting both the source loudness and the target loudness into respective 8-bit integers and storing each of the 8-bit integers into the bitstream as part of the metadata. In another aspect, the bitstream comprises an encoded audio signal with the metadata, wherein a signal level of the encoded audio signal is the same as a signal level of the received audio signal. In one aspect, the target loudness is a first target loudness, and the bitstream is a first bitstream, wherein the method further comprises: receiving a second target loudness subsequent to receiving the first target loudness; and producing a second bitstream by encoding the audio signal and including new metadata that has the source loudness and the second target loudness. In some aspects, the second target loudness is received via a user input device. In another aspect, the audio component comprises a plurality of audio signals to which the audio signal belongs, wherein the target loudness is associated with the plurality of audio signals. In one aspect, the plurality of audio signals is in a higher order ambisonics (HOA) format that represents the audio component within the audio scene.

According to another aspect of the disclosure is an audio encoder device including: at least one processor; and memory having stored therein instructions which when executed by the processor causes the audio encoder device to: receive an audio component associated with an audio scene, the audio component including an audio signal; determine a source loudness of the audio component based on the audio signal; receive a target loudness for the audio component; and encoding the audio component and metadata that comprises the source loudness and the target loudness into a bitstream for an electronic device.

In one aspect, determining the source loudness includes retrieving the source loudness from memory, the source loudness is an overall loudness that spans a duration of the audio signal. In another aspect, determining the source loudness of the audio component includes applying the audio signal to a loudness model. In some aspects, encoding the metadata includes converting both the source loudness and the target loudness into respective 8-bit integers and storing each of the 8-bit integers into the bitstream. In some aspects, the bitstream includes an encoded audio signal with the metadata, wherein a signal level of the encoded audio signal is the same as a signal level of the audio signal of the received audio component.

According to another aspect of the disclosure is a non-transitory machine-readable medium having instructions stored therein which when executed by at least one processor of a first electronic device causes the first electronic device to: determine a source loudness of an audio component associated with an audio scene, the audio component including an audio signal; receiving a target loudness for the audio component; producing a bitstream with the audio component by encoding the audio signal and including metadata that has the source loudness and the target loudness; and transmitting the bitstream to an electronic device.

According to another aspect of the disclosure is a decoder side method, which may be performed by an electronic device (e.g., an audio playback device), for decoding audio content and metadata that describes one or more loudness levels of the audio content. The decoder side receives a bitstream that was produced by an encoder side, the bitstream that comprising: 1) a first audio signal of a first audio component associated with an audio scene, a first target loudness for the first audio component, and a first loudness of the first audio component that was determined by the encoder side based on the first audio signal, and 2) a second audio signal of a second audio component associated with the audio scene, a second target loudness for the second audio component, and a second loudness of the second audio component that was determined by the encoder side based on the second audio signal; determines a first scalar gain based on the first loudness and the first target loudness; determines a second scalar gain based on the second loudness and the second target loudness; produces a first gain-adjusted audio signal by applying the first scalar gain to the first audio signal; produces a second gain-adjusted audio signal by applying the second scalar gain to the second audio signal; and produces the audio scene that includes the first audio component and the second audio component by combining the first gain-adjusted audio signal and the second gain-adjusted audio signal into a group of one or more signals.

In one aspect, the first scalar gain is determined based on a difference between the first target loudness and the first source loudness and the second scalar gain is determined based on a difference between the second target loudness and the second source loudness. In another aspect, the first scalar gain is different than the second scalar gain. In some aspects, the first scalar gain and the second scalar gain are the same. In one aspect, the metadata of the bitstream includes an audio scene loudness that was determined by the encoder, wherein the method further comprises producing a gain-adjusted group of signals by applying the audio scene loudness. In another aspect, the encoder determined the audio scene loudness based on a mixed channel that comprises the first gain-adjusted audio channel and the second gain-adjusted audio channel. In some aspects, producing the gain-adjusted group of signals: producing a normalization gain based on a difference between the scene target loudness and the audio scene loudness; and applying the normalization gain to the group of signals. In one aspect, the first source loudness, the second source loudness, the first target loudness, and the second target loudness are each an 8-bit integer within the metadata. In another aspect, the audio scene may be spatially rendered for playback through one or more speakers of an electronic device.

According to another aspect of the disclosure, an audio decoder apparatus comprising: a processor, and memory having stored therein instructions that configure the processor to obtain a bitstream, the bitstream comprising: a plurality of encoded audio components of an audio scene; for each audio component of the plurality of audio components, a source loudness of the audio component that was determined by an audio encoder apparatus by performing a loudness measurement process upon an audio signal of the audio component; a target loudness of the audio component that was received by the audio encoder apparatus; and an audio scene loudness of the audio scene that was estimated by the audio encoder apparatus by performing the loudness measurement process upon a plurality of gain-adjusted audio signals, wherein each gain-adjusted audio signal was produced by the audio encoder apparatus for a respective audio component by applying a normalization gain based on the source loudness and target loudness of the respective audio component. In one aspect, the audio signal is a portion of an entire audio signal that makes up the audio component, wherein the source loudness is an average loudness across the portion of the entire audio signal that is received.

In one aspect, the portion is a first portion and the source loudness is a first source loudness, wherein the memory has further instructions that configured the processor to obtain additional bitstream comprising: an encoded version of a second portion of the entire audio signal; and a second source loudness that was determined by the audio encoder apparatus by performing a loudness measurement process upon the first and second portion of the entire audio signal, wherein the second source loudness is an average loudness across the first and second portions. In another aspect, the second source loudness converges closer to an overall loudness of the entire audio signal than the first source loudness. In some aspects, the bitstream includes several audio channel groups, each audio channel group representing an encoded audio component, where the bitstream includes an 8-bit integer that indicates a number of the audio channel groups within the bitstream.

The above summary does not include an exhaustive list of all aspects of the disclosure. It is contemplated that the disclosure includes all systems and methods that can be practiced from all suitable combinations of the various aspects summarized above, as well as those disclosed in the Detailed Description below and particularly pointed out in the claims. Such combinations may have particular advantages not specifically recited in the above summary.

BRIEF DESCRIPTION OF THE DRAWINGS

The aspects are illustrated by way of example and not by way of limitation in the figures of the accompanying drawings in which like references indicate similar elements. It should be noted that references to "an" or "one" aspect of this disclosure are not necessarily to the same aspect, and they mean at least one. Also, in the interest of conciseness and reducing the total number of figures, a given figure may be used to illustrate the features of more than one aspect, and not all elements in the figure may be required for a given aspect.

FIG. 7 shows a table of an enhancement to bitstream syntax of MPEG-D DRC according to some aspects.

FIG. 8 shows another table of enhancement to bitstream syntax of MPEG-D DRC according to some aspects.

DETAILED DESCRIPTION

Figure 1:
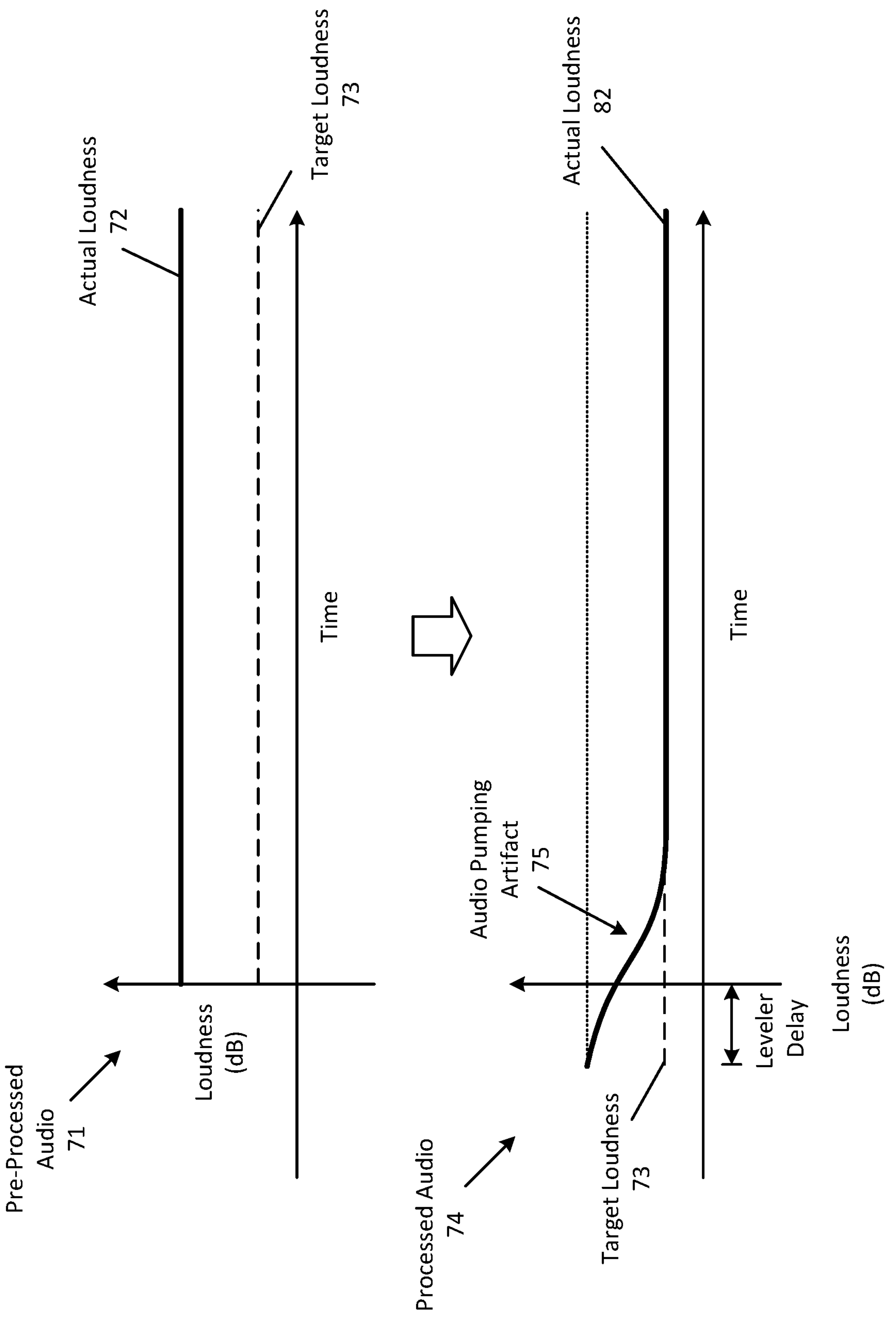
FIG. 1 shows an example of loudness levels of an audio component that is processed at an audio leveler device using traditional methods.

Several aspects of the disclosure with reference to the appended drawings are now explained. Whenever the shapes, relative positions and other aspects of the parts described in a given aspect are not explicitly defined, the scope of the disclosure here is not limited only to the parts shown, which are meant merely for the purpose of illustration. Also, while numerous details are set forth, it is understood that some aspects may be practiced without these details. In other instances, well-known circuits, structures, and techniques have not been shown in detail so as not to obscure the understanding of this description. Furthermore, unless the meaning is clearly to the contrary, all ranges set forth herein are deemed to be inclusive of each range's endpoints.

As used herein, an extended reality (XR) environment (or presentation) refers to a wholly or partially simulated environment that people sense and/or interact with via an electronic device. For example, the XR environment may include augmented reality (AR) content, mixed reality (MR) content, virtual reality (VR) content, and/or the like. There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers.

An audio program (e.g., a musical composition, a podcast, audio of an XR environment, a sound track of a motion picture, etc.) may include one or more audio scenes (e.g., as sound segments), where each audio scene includes (and may be characterized by) one or more audio scene components (e.g., sound sources) that originate within the audio scene. For example, an audio scene of a virtual living room may include dialog of a person within the room as one audio component while the sound of a dog barking may be another audio component. As a result, the audio scene may be three-dimensionally (3D) spatially rendered, when audio scene components associated with the scene are spatially rendered such that a listener perceives them as originating from particular locations within an acoustic (e.g., physical) space (e.g., about the listener). As another example, when the audio program is a sound track of a motion picture, one audio component may be dialog while another audio component may be a score of the motion picture. As yet another example, when the audio program includes multiple sound tracks (e.g., having sound tracks of a musical album or having sound tracks of a motion picture series), an audio component may be an individual sound track and/or may represent the entire group (or album) of sound tracks.

In one aspect, audio components (e.g., and/or an audio scene) may be represented in one of various audio formats, such as being one or more audio channels (in a channel groups). For instance, an audio component may include a mono audio channel or may be in a multi-audio channel format (e.g., two stereo channels, six surround source channels (in 5.1 surround format), etc.). In another aspect, audio components may be represented as audio objects, which include one or more audio signals (e.g., in a channel group), and positional data (for spatially rendering the audio signals), and/or may be represented in a higher order ambisonics (HOA) audio format. When a complete scene is produced (e.g., by a content creator), the loudness of each scene component associated with the scene may be controlled at the time of production to achieve a good (or desired) overall balance for a listener.

Loudness normalization is the process of applying a normalization gain to an audio program to bring the average amplitude to a target loudness level. To achieve loudness normalization, an integrated loudness measurement is performed upon the audio program, which is similar to a root mean squared, RMS, but more truthful in terms of human hearing. It may be equivalent to program (or overall) loudness in that it measures how loud a sound program is over its entire (or at least a portion of its) duration. The integrated loudness level is subtracted from a target loudness level to derive the normalization gain in decibels (dB). The normalization gain is then applied to the entire (or at least a portion of) audio program.

Loudness normalization upon an audio program may be performed offline (e.g., using a produced audio program), which allows for a determination of the overall loudness of the audio program. Loudness normalization, however, may be performed upon an audio program in real-time, e.g., as the audio program is a live or real-time digital audio recording that is being encoded and streamed (e.g., over the Internet) to an audio playback device. Traditionally, a loudness normalization adjustment may be performed by an audio leveler device at an encoding side, which encodes and transmits the audio program of which the audio leveler device applies a normalization gain to a decoder side. To accomplish this, as the audio leveler device receives real-time audio data, it measures the actual loudness level of the received audio data, and then uses the measurement to adjust the loudness of the received audio data according to a target loudness level. The measured loudness, however, may diverge from the overall loudness level of the audio program (e.g., in a beginning portion of the program), due to the audio leveler device only receiving a portion of the audio program, which results in a loudness error. As the audio program is streamed, however, the measured loudness level may eventually converge to the overall (e.g., program) loudness of the audio program. Due to real-time constraints (e.g., the measured loudness level diverging from the overall loudness, which is a result of the audio program being unknown to audio leveler device beforehand), however, undesirable audio artifacts (e.g., audio pumping artifacts which are sudden increases or decreases in the loudness level) may be included within (e.g., at least the beginning of) the streamed audio program due to the loudness error.

FIG. 1 shows an example of loudness levels of audio data that is processed at an audio leveler device using these traditional methods. Specifically, this figure shows an actual (or integrated) loudness 72 of a pre-processed audio 71, which may be the overall loudness of the audio data (e.g., which may span a time duration of at least a portion of the audio), and a target (e.g., desired) loudness 73 of the audio (e.g., which may be the desired loudness level at playback). Below this, shows the processed audio 74 by an audio leveler device, showing the actual loudness 82 of the processed audio 74 being reduced to the target loudness 73 as a result of the audio leveler device normalizing the audio to the target loudness 73. At the beginning portion of the processed audio component, the actual loudness has a sharp reduction, which adds an audio pumping artifact 75 to the processed audio 74, which may be due the convergence of the actual loudness measurement performed by the audio leveler device to the target loudness. This pumping artifact 75 may result in an undesirable audio effect when rendered at the decoder side. In addition to having the artifact 75, the processed audio 74 is irreversible, meaning that the playback device to which the audio is streamed and rendered, receives the processed audio and cannot reproduce the original audio data (e.g., by performing audio signal processing operations) at the pre-processed audio loudness level, and also the processed audio includes some leveler processing delay. Thus, there is a need for a system that provides a metadata-based solution that defers adjusting loudness of audio components of an audio scene to a decoder-side device in order to reduce or eliminate artifacts that are associated with traditional processes.

To solve this problem, the present disclosure provides an audio codec system that adjusts loudness levels of audio components at a decoder-side device (or decoder side) based on loudness metadata (which may be referred to as "metadata" herein) produced at an encoder-side device (or encoder side) that includes a target loudness (or production loudness) and the source loudness of the audio components. Specifically, the encoder side (which may be implemented by as a programmed processor e.g., one or more processors that execute or are configured by instructions stored in memory as part of a media source device) receives an audio component associated with an audio scene (of an audio program), where the audio component includes at least one audio signal. The encoder side determines a source loudness of the audio component based on the audio signal (e.g., by performing a loudness measurement process), and receives a target loudness for the audio component (e.g., which may be greater or less than the measured loudness level). The encoder side produces a bitstream with the audio component by encoding the audio signal (e.g., according to an audio codec, such as Advanced Audio Coding (AAC)) and including encoded metadata that has the source loudness and the target loudness. The encoder side may transmit the bitstream (e.g., via the Internet) to an electronic device (e.g., a decoder-side device or decoder side).

The decoder side may also be implemented as (or by) a programmed processor of an audio playback device. The decoder side receives the bitstream that was produced by the encoder side, which includes an encoded version of an audio signal for an audio component of an audio scene, and the loudness level of the audio signal and the target loudness level of the audio signal as metadata received with the bitstream. The decoder side determines a scalar gain based on (e.g., a difference between) the loudness level and the target loudness level, and applies the scalar gain to the audio signal.

Deferring the loudness adjustment to the decoder side has several advantages. First, unlike traditional audio leveler devices which cause audio pumping due to a divergence (e.g., loudness error) between a measured loudness and a target loudness (e.g., at a beginning of an audio program), the audio codec system of the present disclosure may reduce or eliminate the effect by taking advantage of existing encoding delay to provide lookahead for the loudness measurement at the encoder side. Specifically, the source loudness may be measured over a greater portion of the received audio component, than traditional devices are able. Larger lookahead enables the audio codec system to reduce an initial loudness estimation error. In addition, the encoding side may provide loudness measurement updates during live streaming to the decoder side so that the loudness of the audio component can be adjusted as the measurement converges to the overall loudness of the audio component. As a result of metadata updates, the audio codec system may eliminate loudness error at the decoder side due to the loudness measurement being identical to one generated in an ideal offline process. The metadata-solution has other advantages, such as providing a single-pass encoding of the audio component, thereby avoiding a separate pass for a loudness measurement, single pass writing of the encoder output into the bitstream, reducing (or eliminating) loudness error or pumping artifacts after decoding, and reducing (or eliminating) any additional delay.

Figure 2:
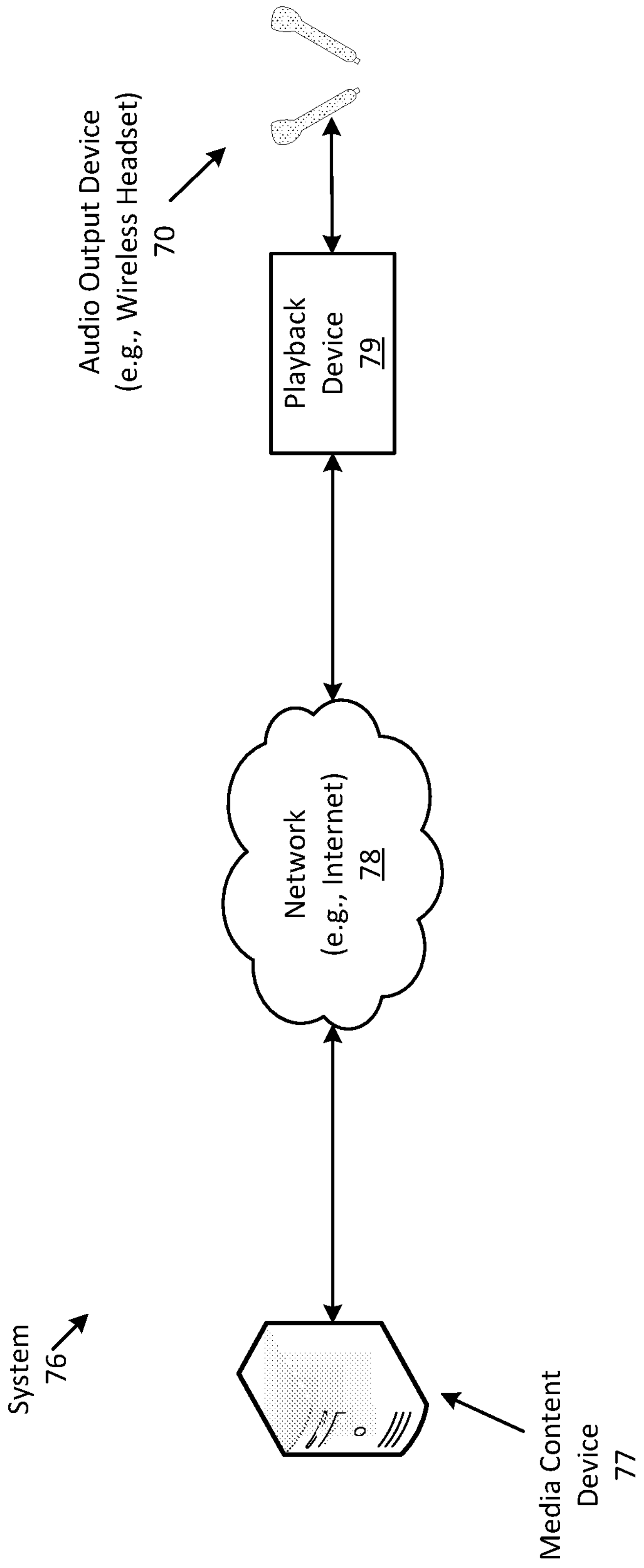
FIG. 2 shows a system that produces a bitstream that includes encoded audio content of an audio scene and loudness metadata, which is used to control loudness of the audio scene.

FIG. 2 shows a system 76 (e.g., audio system) that produces a bitstream that includes encoded audio content of an audio scene and loudness metadata, which may be used by the system to control loudness of the audio scene. Specifically, the system includes a playback device 79, an audio output device 70, a (e.g., computer) network 78 (e.g., the Internet), and a media content device (or server) 77. In one aspect, the system may include more or fewer elements, such as having one or more (additional) servers, or not including a playback device. In which case, the output device may be (e.g., directly) communicatively coupled to the media content device, as described herein.

In one aspect, the media content device 77 may be a stand-alone electronic server, a computer (e.g., desktop computer), or a cluster of server computers that are configured to perform digital signal processing, as described herein. In particular, the content device may be configured to produce (and/or) receive audio programs (which may include one or more audio components), and may be configured to perform encoder-side operations as described herein to produce a bitstream with the encoded audio program and with associated loudness metadata (or metadata). As shown, the content device may be communicatively coupled (e.g., via the network 78) to the playback device 79 in order to provide digital audio data and metadata, using an encoded bitstream. More about the operations performed by the content device is described herein.

In one aspect, the playback device 79 may be any electronic device (e.g., with electronic components, such as a processor, memory, etc.) that is capable of performing decoding operations upon an audio bitstream to decode an encoded audio signal and extract metadata associated with the audio signal, and perform audio signal processing operations upon the decoded audio signal according to the extracted metadata. In another aspect, the playback device may be capable of spatially rendering audio content using one or more spatial filters, such as head-related transfer functions (HRTFs), for audio playback (e.g., via one or more speakers that may be integrated within the playback device and/or within the output device 70, as described herein). For example, the playback device may be a desktop computer, a laptop computer, a digital media player, etc. In one aspect, the device may be a portable electronic device (e.g., being handheld operable), such as a tablet computer, a smart phone, etc. In another aspect, the device may be a head-mounted device, such as smart glasses, or a wearable device, such as a smart watch.

In one aspect, the output device 70 may be any electronic device that includes at least one speaker and is configured to output (or playback) sound by driving the speaker. For instance, as illustrated the device is a wireless headset (e.g., in-ear headphones or wireless earbuds) that are designed to be positioned on (or in) a user's ears, and are designed to output sound into the user's ear canal. In some aspects, the earbuds may be a sealing type that has a flexible ear tip that serves to acoustically seal off the entrance of the user's ear canal from an ambient environment by blocking or occluding in the ear canal. As shown, the output device includes a left earbud for the user's left ear and a right earbud for the user's right ear. In this case, each earbud may be configured to output at least one audio channel of audio content (e.g., the right earphone outputting a right audio channel and the left earphone outputting a left audio channel of a two-channel input of a stereophonic recording, such as a musical work). In another aspect, each earbud may be configured to playback one or more spatially rendered audio signals. In which case, the output device may playback binaural audio signals produced using one or more HRTFs, where the left earbud plays back a left binaural signal, while the right earbud plays back a right binaural signal. In another aspect, the output device may be any electronic device that includes at least one speaker and is arranged to be worn by the user and arranged to output sound by driving the speaker with an audio signal. As another example, the output device may be any type of headset, such as an over-the-ear (or on-the-ear) headset that at least partially covers the user's ears and is arranged to direct sound into the ears of the user.

In some aspects, the output device 70 may be a head-worn device, as illustrated herein. In another aspect, the audio output device may be any electronic device that is arranged to output sound into an ambient environment. Examples may include a stand-alone speaker, a smart speaker, a home theater system, or an infotainment system that is integrated within a vehicle.

As described herein, the output device 70 may be a wireless headset. Specifically, the output device may be a wireless device that may be communicatively coupled to the playback device 79 in order to exchange digital data (e.g., audio data). For instance, the playback device may be configured to establish the wireless connection with the output device via a wireless communication protocol (e.g., BLUETOOTH protocol or any other wireless communication protocol). During the established wireless connection, the playback device may exchange (e.g., transmit and receive) data packets (e.g., Internet Protocol (IP) packets) with the output device, which may include audio digital data in any audio format.

In another aspect, the playback device 79 may communicatively couple with the output device 70 via other methods. For example, both devices may couple via a wired connection. In this case, one end of the wired connection may be (e.g., fixedly) connected to the output device, while another end may have a connector, such as a media jack or a universal serial bus (USB) connector, which plugs into a socket of the playback device. Once connected, the playback device may be configured to drive one or more speakers of the output device with one or more audio signals, via the wired connection. For instance, the playback device may transmit the audio signals as digital audio (e.g., PCM digital audio). In another aspect, the audio may be transmitted in analog format.

In some aspects, the playback device 79 and the output device 70 may be distinct (separate) electronic devices, as shown herein. In another aspect, the playback device may be a part of (or integrated with) the output device. For example, at least some of the components of the playback device (such as one or more processors, memory, etc.) may be part of the output device, and/or at least some of the components of the output device may be part of the playback device. In which case, at least some of the operations performed by the playback device may be performed by the output device.

Figure 3:
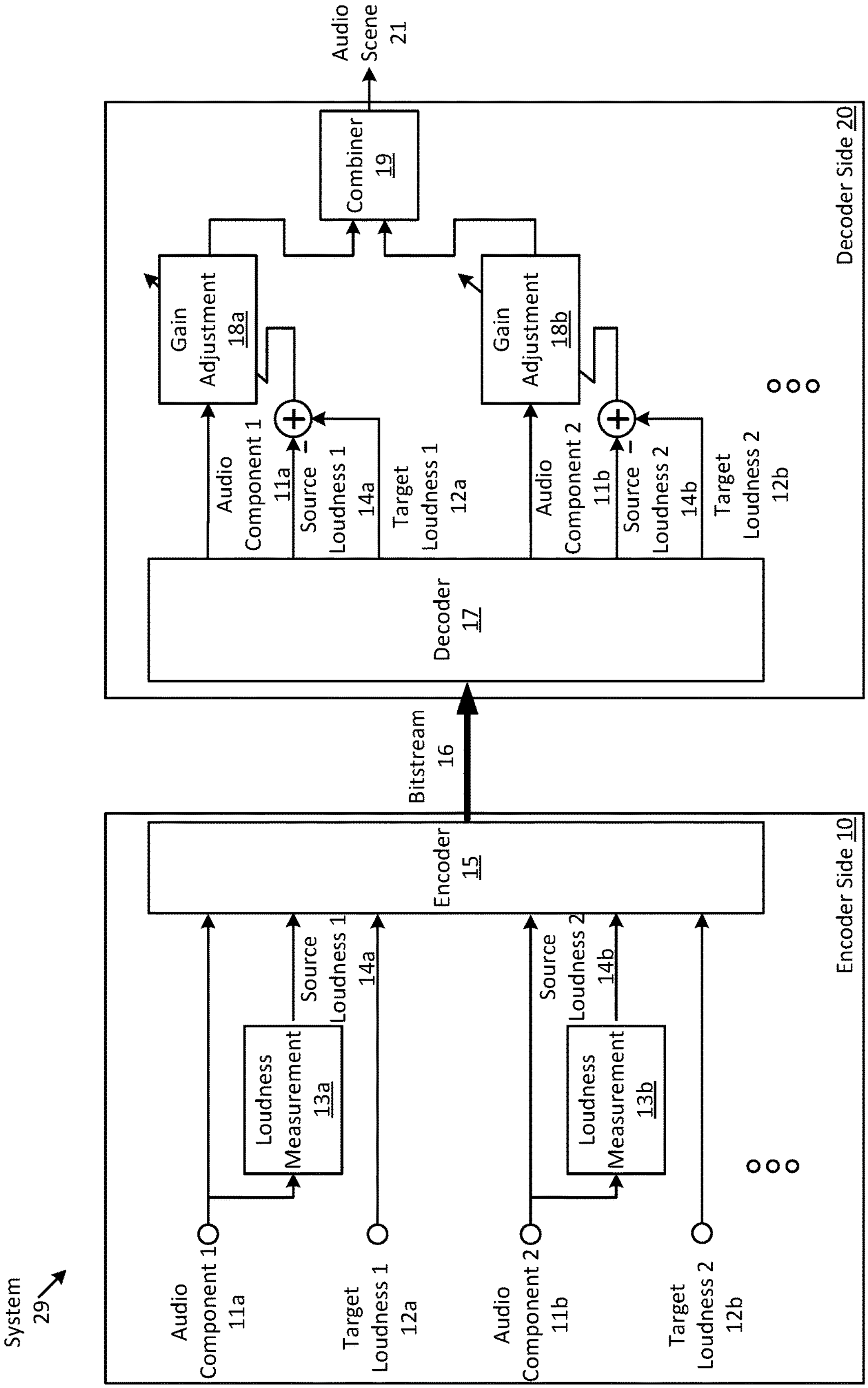
FIG. 3 is a block diagram of an audio codec system that produces a bitstream of encoded audio content and loudness metadata at an encoder side, and receiving the bitstream and using the metadata to adjust loudness of the audio content at a decoder side according to one aspect.

FIG. 3 is a block diagram of an audio codec system 29 that produces a bitstream of encoded audio content and encoded loudness metadata at an encoder side, and receives the bitstream and uses the loudness metadata to adjust loudness of the audio content (e.g., for playback) at a decoder side according to one aspect. The system includes an encoder side 10 that may be implemented by one or more processors that execute or are configured by instructions stored in memory generically referred to here as "a programmed processor", for example in one or more devices. For instance, the encoder side may be implemented by the media content device 77 and/or may be implemented by one or more servers that are communicatively coupled to one or more devices via the Internet. The system also includes a decoder side 20 that may be implemented by a programmed processor by one or more devices, such as the playback device 79 and/or the output device 70 of system 76.

In one aspect, the audio codec system 29 may perform operations for encoding and decoding audio data of an audio program in real-time. In which case, the digital signal processing operations described herein may be continuously (e.g., periodically) performed upon a stream of audio data of the audio program. In particular, the operations may be performed from a beginning of the audio program (or a starting time at which the audio program is to be streamed) to an end of the audio program (or a stopping time at which the audio program is no longer streamed in real-time). In some aspects, the operations may be performed periodically such that the audio codec system 29 performs the operations for one or more segments of the audio program that is being received and streamed for playback at a decoder-side device. More about the performance of operations in real-time is described herein.

The encoder side 10 will now be described. The encoder side 10 receives (e.g., an audio program as) one or more audio components, where the audio components may be associated with (e.g., being a part of or making up) an audio scene (of the audio program). Each audio component may include audio data as one or more audio signals (or channels) that includes at least a portion of audio content associated with an audio program. For instance, an audio component may be an audio object that includes at least one audio signal and spatial parameters (e.g., positional data) associated with the audio object. In one aspect, the spatial parameters may be used to spatially render the audio object during playback. The audio object may be associated with a (virtual) sound source within an audio scene (when rendered for output through one or more speakers). As another example, an audio component may include a channel group, where each channel include at least a portion of the audio program. In particular, an audio component may be a stereo channel group that includes two channels (e.g., a left-side channel and a right-side channel). In this example, the encoder side receives two audio components (a first audio component 11*a* and a second audio component 11*b*). The encoder side 10 also receives a first target loudness 12*a* and a second target loudness 12*b* (e.g., in dB or dBA (A-weighted) or LKFS (loudness K-weighted level full scale), where each loudness may be a desired loudness level for a particular (or one or more) audio components. For instance, the first target loudness 12*a* may be associated with first audio component 11*a*, and second target loudness 12*b* may be associated with second audio component 11*b*. In one aspect, the target loudness levels may be predefined. In another aspect, the target levels may be user defined. For instance, the encoder side may receive one or more target levels via a user input device, which may be any type of input device (e.g., keyboard, touchscreen, etc.) that may be coupled to the device (e.g., media content device 77) that is performing the encoder-side operations. In another aspect, the target loudness levels may be defined during production (or creation) of the audio program with which the audio components are associated.

As described herein, an audio component may include one or more audio signals. In one aspect, the encoder side may receive one or more target loudness levels for an audio component, where each target loudness level may be for at least one of the audio component's audio signals. For example, an audio component may include a channel group (of audio signals), in which case the encoder side may receive a single target loudness level for the group, or may receive multiple target loudness levels, for different audio signals of the group.

As shown, the encoder side includes several operational blocks to perform one or more audio signal processing operations described herein. For instance, the encoder side includes loudness measurements 13*a* and 13*b* and an encoder 15. Each of the loudness measurements is configured to measure (determine or estimate) the source (or actual) loudness of their respective audio components. For example, the loudness measurement 13*a* may be configured to receive the first audio component 11*a*, or more specifically one or more audio signals of the audio component and measure the loudness of the audio signal(s). In one aspect, the loudness measurement block may collect one or more samples of the audio signal (which may include one or more audio frames), and may compute a measure of loudness of at least some of the samples. As described herein, the loudness measurement may be able to collect samples (e.g., over a period of time, such as one second), due to the encoder delay of the encoder 15 that provides lookahead. From the samples, the loudness measurement may produce the source loudness as an average loudness over a duration (or span) of the collected samples. In one aspect, the loudness measurement may repeat these operations (e.g., periodically) to produce in effect a "running average" of loudness of the audio component. More about the running average is described herein.

In one aspect, to determine the loudness, the loudness measurements 13*a* and/or 13*b* may apply their respectively received audio signals into a (predefined) loudness model that computes or estimates the loudness level as output. In another aspect, the loudness measurements may perform a spectral analysis upon the (e.g., collected samples of the) audio signal to determine the loudness. In one aspect, when the audio component comprises a group of one or more audio signals, the loudness measurement may determine at least one loudness level for the group of signals. In another aspect, the loudness measurement may estimate a loudness level for each (or at least some) of the group of signals individually. In another aspect, the loudness measurements 13*a* and/or 13*b* may use any known method to estimate loudness levels. Thus, the loudness measurement 13*a* may produce a source loudness 14*a* for audio component 11*a* and loudness measurement 13*b* may produce a source loudness 14*b* for audio component 11*b*. In one aspect, there may be a loudness measurement block for each received audio component. In which case, the encoder side 10 may perform loudness measurement operations upon each or at least some of the received audio components.

The encoder 15 may be configured to receive the audio components and loudness levels. In particular, the encoder 15 receives audio components 11*a* and 11*b*, source loudness levels 14*a* and 14*b*, and target loudness levels 12*a* and 12*b*, and may be configured to produce a bitstream 16 that includes the audio components and their respective loudness levels by encoding audio data of the audio components and including (or writing) metadata into the bitstream that has the loudness levels. In one aspect, the encoder may write other data into the metadata. For instance, the encoder may add spatial parameters (e.g., positional data) associated with the audio components, with which the decoder side may use to spatially render the audio components. In one aspect, the encoder may encode the audio signals associated with the audio components according to any audio codec, such as Advanced Audio Coding (AAC). The encoder side may transmit the bitstream 16 (e.g., via the network 78) to the decoder side 20. In particular, the electronic device executing the encoder operations may transmit the bitstream to another electronic device that is to execute (or is executing) decoder operations (and playback operations). In one aspect, the encoder side 10 may store (at least a portion) of the bitstream in (e.g., local, or remote) memory.

The decoder side 20 receives the bitstream 16 that was produced by the encoder side 10, which may include an encoded version of (one or more audio signals associated with each of) the audio component 11*a* and 11*b* associated with an audio scene, and several loudness levels, as metadata, associated with each of the audio components. The bitstream may include 1) one or more audio signals of the audio component 11*a*, and source loudness 14*a* and target loudness 14*b* associated with the audio component 11*a*, and 2) one or more audio signals of audio component 11*b*, and source loudness 14*b* and target loudness 12*b* associated with the audio component 11*b*.

The decoder side 20 may use (at least a portion of) the metadata within the bitstream to adjust loudness levels of one or more audio components. Specifically, in contrast to traditional methods that may adjust levels at the encoder side, the audio codec system 29 may adjust loudness levels at the decoder side 20. As a result, the levels of the audio data transmitted within the bitstream 16 may be the same (or similar) to the levels of the audio data received at the encoder side. In particular, the encoded audio signal(s) within the bitstream may have a signal level (e.g., loudness level) that is the same as the signal level of the audio signal received at the encoder side. As shown, the decoder side 20 includes a decoder 17, gain adjustments 18*a* and 18*b*, and a combiner 19. The decoder 17 may be configured to undo the encoding processing by (using an audio codec for) decoding the (e.g., encoded audio signals of the) audio components within the bitstream. The decoder may also be configured to extract the loudness levels from the metadata.

Each gain adjustment 18*a* and 18*b* may be configured to receive (at least one) audio component and to adjust the gain based on the audio component's loudness level and target loudness level. For example, gain adjustment 18*a* receives the audio signal associated with the audio component 11*a* and applies a normalization gain, which may be a scalar gain, based on the target loudness 12*a* and the source loudness 14*a* of the audio component 11*a* to produce a gain-adjusted audio signal. Specifically, the gain adjustment 18*a* determines the scalar gain based on a difference between the target loudness 12*a* and the source loudness 14*a* of the audio component 11*a*. In one aspect, the gain adjustment 18*b* performs similar operations with respect to the audio component 11*b* to produce a gain-adjusted audio signal of the audio component 11*b*. In one aspect, the scalar gains applied by the gain adjustments 18*a* and 18*b* may be the same, or they may be different.

The combiner 19 may be configured to receive the gain-adjusted audio components from the gain adjustments 18*a* and 18*b*, and may be configured to combine the audio components to produce the audio scene 21. In particular, the combiner may receive gain-adjusted audio signal(s) from each gain adjustment, and combine the signals into one or more signals that make up the audio scene 21 (e.g., audio data which when rendered produces the audio scene 21 through one or more speakers). For example, when the audio components are in stereo format (e.g., being a left audio channel and a right audio channel), the combiner may combine the audio channels into a signal channel, or may mix similar channels (e.g., mixing all right channels together and mixing all left channels together). In some aspects, the combiner may perform matrix mixing operations to produce a mix of at least some of the gain-adjusted audio signals as the audio scene 21. In another aspect, the combiner may not mix channels together, but instead may group channels together (which may be used by an audio renderer (not shown) to spatially render the audio scene 21).

In one aspect, the audio scene 21 may be passed to an audio rendering (renderer) block (not shown) that may ultimately spatially render the audio scene 21 for playback through one or more speakers. In particular, the renderer may produce one or more transducer (speaker) driver input signals that include audio of the audio scene 21 that convert the combined audio signals to sound output by the speakers. In one aspect, the audio rendering block may be configured to spatially render the combined gain-adjusted audio components that make up the audio scene 21 to produce one or more driver input signals. For instance, the rendering block may spatially render the audio scene according to positional data that is received with the audio scene's audio components bitstream. In particular, the rendering block may apply one or more spatial filters, such as HRTFs to the gain-adjusted audio signals of each audio component according to positional data associated with the audio component, such that sounds are perceived by the listener as originating from a particular location within an acoustic space. In another aspect, the combined audio signals may be used to drive the one or more speakers to output the audio scene.

As described thus far, the audio codec system 29 receives at least one audio component, estimates a source loudness of the audio component, receives a target loudness for the audio component, and produces a bitstream that includes an encoded version of the audio component and includes encoded loudness levels as metadata. As described herein, the audio codec system may perform (at least some of) these operations in real-time, meaning that the system may continuously (or periodically) perform at least some of these operations as audio signals of the audio components are being received by the encoder side to be streamed to the decoder side 20. The encoder side may periodically perform loudness measurement operations for received segments (e.g., one or more audio frames) of the audio program, as it is received, and may provide loudness updates (via the streamed bitstream) to the decoder side, which may perform decoder-side operations to update the audio scene for spatial audio playback.

In one aspect, the encoder side 10 may provide source loudness updates, which converge towards (or at) the overall loudness of the audio component. Specifically, the loudness measurement 13*a* may measure loudness of at least a portion of the live or real-time event of the audio component that is received by the encoder side received, and produce a single loudness value (e.g., as the source loudness 14*a*) that represents the measured loudness as a single, integrated loudness value. This value, however, may not represent the overall loudness of the entire audio program since this value cannot be computed until the live event has ended (e.g., at which point the entire audio program has been received and processed by the encoder side). Until then, the loudness measurement may collect (at least some) samples of the live audio, that is being sent to the encoder over a time interval which may be longer than a single audio frame of 5-100 msec, such as a few seconds, and computes a measure of loudness of that interval. In one aspect, the loudness measurement may then "integrate" or collects several of such measures going back to the start of the audio program, e.g., averages them, to compute a source loudness update. The source loudness update may be a measure of loudness only for the portion of the sound program that has been played back or streamed until that current update. This measure may be repeated, e.g., periodically, to produce in effect a "running average" source loudness, and as a result, the encoder side transmits the latest, source loudness update (which is a single value) to the decoder side, which then uses the loudness update to update one or more decoder-side operations described herein. Note that the term "running average" as used here does not require an actual average to be performed, just some measure of loudness of the sound program from the start of the program until the current update, based on collecting loudness measurements including evaluating statistics of the collected loudness measurements. The updates (running averages) may be computed and then provided as part of a bitstream that also contains the encoded sound program (encoded audio signal), as a plurality of instances of a source loudness update field, with adjacent instances in the bitstream being between one to ten seconds apart, over the duration of the sound program.

As an example, upon receiving a first segment, the encoder side 10 may determine the loudness level of one or more audio components of the segment, and then transmit the segments in the bitstream with associated target loudness levels and measured source loudness levels. Then, the encoder side may perform at least some of these operations for subsequently received segments. In which case, the encoder side may be configured to update at least some of the loudness levels (e.g., the measured loudness level by the loudness measurement block) based on changes to the audio program.

Note also that the term "source loudness update" may also be referred to as a running average loudness or a "partial source loudness"; at the end of the sound program the last or final source loudness update may represent the overall loudness of the entire sound program (also referred to as the integrated loudness or program loudness as for example described in Recommendation ITU-R BS.1770-4 (10/2015) Algorithms to measure audio program loudness and true-peak audio level.)

As described thus far, the encoder side 10 may determine the source loudness of audio components in real-time by performing a loudness measurement. In another aspect, the encoder side may determine one or more source loudness levels by retrieving the levels from memory. In this case, the source loudness may be pre-defined. In some aspects, this pre-defined source loudness may be an overall loudness that spans a length (e.g., at least a partial duration of) an audio signal of an audio component.

In one aspect, the encoder side 10 may produce an audio file that includes the audio component and its associated loudness metadata, and store the audio file in memory. In this case, the encoder side 10 may process an audio program in real-time (e.g., as it is received), but instead of (or in addition to) transmitting the audio program (as loudness levels are measured) to the decoder side 20, the encoder side may store the audio program along with received target loudness levels and measured loudness levels. This provides several advantages over traditional audio leveling methods. For instance, the loudness metadata may be replaced before the audio file is transmitted (via a bitstream) to the decoder side. For example, a user may change (or update) the target loudness level (e.g., during an editing process using an interactive audio editor application) of one or more audio components, once the audio file has been produced. Thus, using this metadata-solution for storing (and transmitting) loudness levels does not require to read or write the complete file again, which would be required using traditional methods, but instead only requires that at least some of the loudness metadata be updated.

In addition, this metadata-solution allows updates to loudness levels after (or while) the decoder side 20 has received (or is receiving) the audio bitstream that includes the audio file encoded by the encoder side. Specifically, since the audio signal of the audio component within the bitstream 16 has not been modified (e.g., has not been gain-adjusted), it is possible to adjust the gain adjustment at the decoder side based on receiving updates of the target loudness. For example, when the loudness metadata is recalculated offline (e.g., at the encoder side), updated target loudness levels may be transmitted (e.g., via the same or different bitstream), which may be used to control the gain adjustment block(s) 18 at the decoder side.

Figure 4:
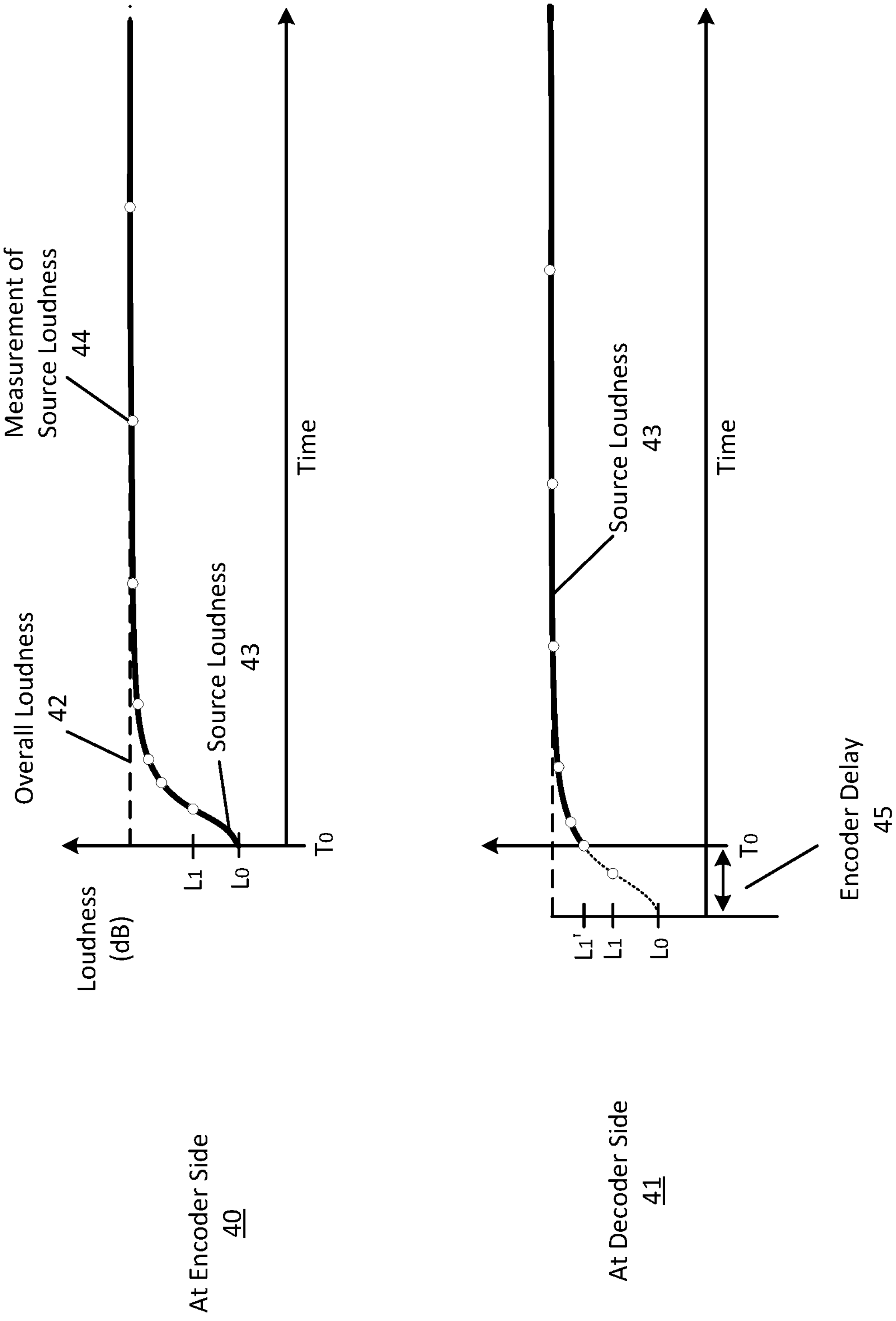
FIG. 4 shows an example of loudness levels of an audio component that is processed using the audio codec system of the present disclosure.

FIG. 4 shows an example of loudness levels of an audio component that is processed using the audio codec system 29 of the present disclosure. This figure is showing the source loudness 43 of an audio component as it converges to an overall loudness 42 of the component based on measurements of the source loudness 44 (e.g., performed by the loudness measurement block in FIG. 3).

As described herein, the encoder side 40 may not know the overall loudness 42, due to the audio data being received and streamed in real-time. Thus, the top curve shows the overall loudness 42 of the audio component (e.g., which may be determined based on an offline measurement of the entire length of the audio component), and shows the source loudness 43 over time (e.g., which may be an extrapolation) of several measurements of source loudness 44, starting at an initial time, $T_0$, having an initial loudness, $L_0$. Specifically, the source loudness 43 may be the measured loudness of the audio component, at particular durations along the audio component, where as time goes on, measurements may begin to converge toward the overall loudness. Thus, subsequent measurements 44 of source loudness converge closer or are equal to the overall loudness 42 (of the entire audio signal of an audio component) as more measurements are taken, which is shown by the seventh measurement 44 converging closer to the overall loudness 42 than the first measurement 44, from $T_0$. This convergence, as described herein, may be due to each measurement 44 being a running average of loudness that spans across a portion of the audio component, which may start at the beginning, $T_0$, of the audio component (e.g., at a start time at which the audio component is streamed to the decoder side). Thus, in this case, the first measurement (closest to $T_0$) may be an initial measurement of the source loudness (e.g., $L_1$), which may be an average loudness across a duration (e.g., of the entire duration) of the audio component, starting at $T_0$ (e.g., a beginning of the audio component) to a later duration (at or before when the first measurement 44 is taken). The other six measurements 44 may be subsequently determined by the loudness measurement, which takes into account a greater-known portion of the audio component, where the sixth measurement 44 that is shown is a running average across a bigger portion of the audio component compared to the other five individual measurements. As a result, each measurement represents a loudness measurement over a portion of the entire (e.g., one or more audio signal(s) of the) audio component.

In one aspect, each measurement of source loudness 44 may be transmitted (e.g., as loudness metadata) within a bitstream, along with encoded portions of the audio component to which the measurement belongs. For instance, the first measurement of source loudness 44 may be transmitted along with a beginning portion of the audio component to the decoder side 41.

The bottom curve shows the source loudness 43 at the decoder side 41. As shown, the decoder side receives an initial source loudness at $T_0$, which has a loudness value of $L_1'$, rather than $L_1$. This is due to the encoder delay 45. As described herein, the encoder may have encoder delay as a result of encoding incoming audio data. The loudness measurement block (e.g., as shown in FIG. 3) at the encoder side may use this delay as lookahead to measure source loudness over a period of time (e.g., the time of the encoder delay). In this case, the loudness measurement block took an initial measurement of source loudness (e.g., the first measurement of source loudness within the encoder delay 45 portion, as shown), and took a subsequent measurement, which was encoded as metadata and transmitted to the decoder side. The decoder side uses the source loudness, at $L_1'$, which converges closer to the overall loudness than the initial measurement of $L_1$ which was taken by the loudness measurement block at the encoder side 40 during the encoder delay 45. In one aspect, as the decoder side continues to receive (e.g., subsequent) portions of the audio data from the encoder side, the decoder side may also receive new measurements of the sound loudness, which converge closer (e.g., than previous received measurements) to the overall loudness 42.

Thus, the audio codec system described herein, reduces the amount of error from 1) between the source loudness at $L_1$ and the overall loudness 42 to 2) between the source loudness 43 at $L_1'$ and the overall loudness 42 at the decoder side in order to reduce or eliminate the audio pumping artifact during playback. In one aspect, each subsequent measurement of source loudness may be transmitted as a source loudness update to the decoder side, as described herein.

Figure 5:
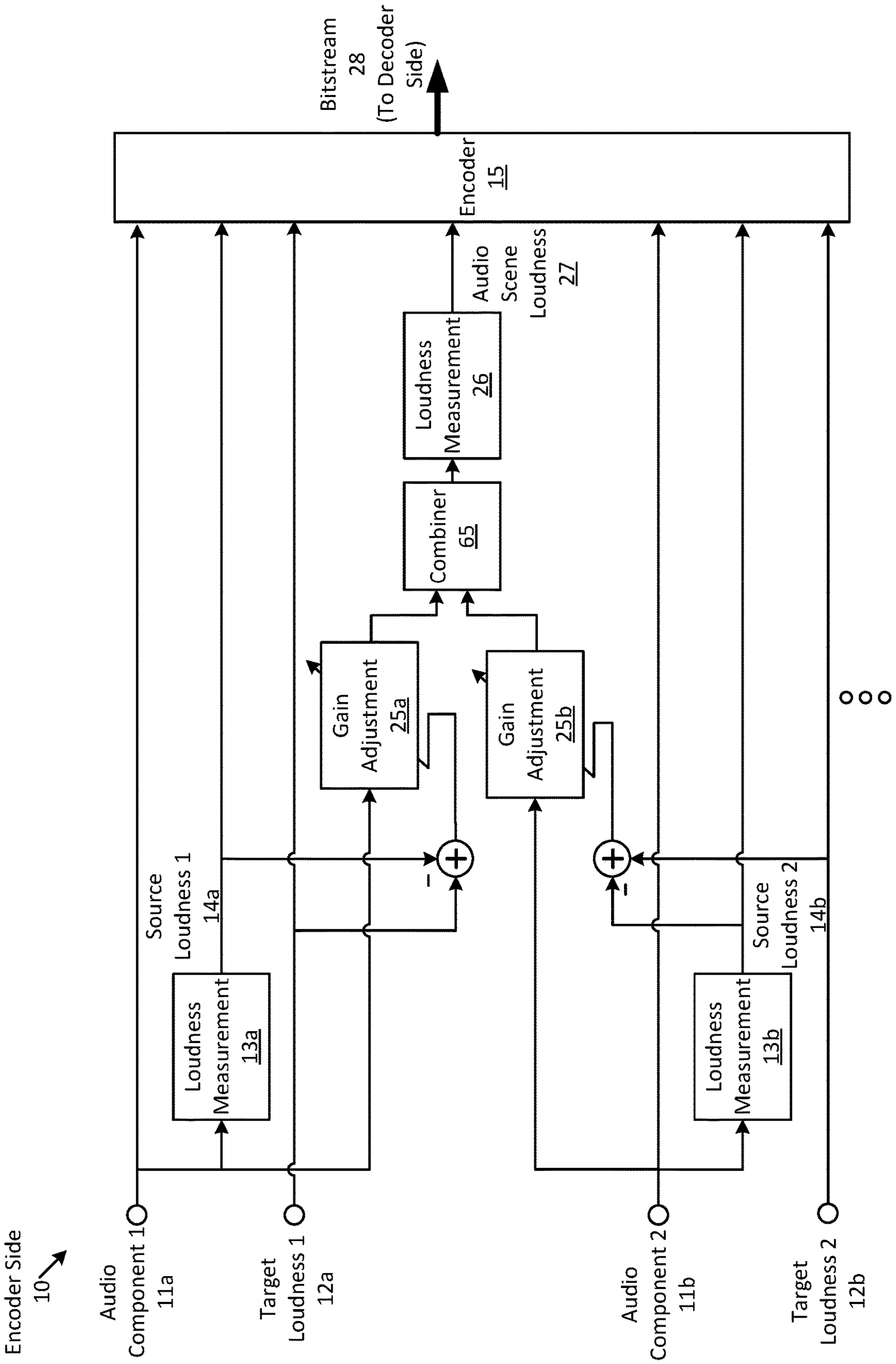
FIG. 5 is a block diagram of an encoder side that produces a bitstream of encoded audio content and loudness metadata for adjusting loudness during playback of the audio content according to one aspect.
Figure 6:
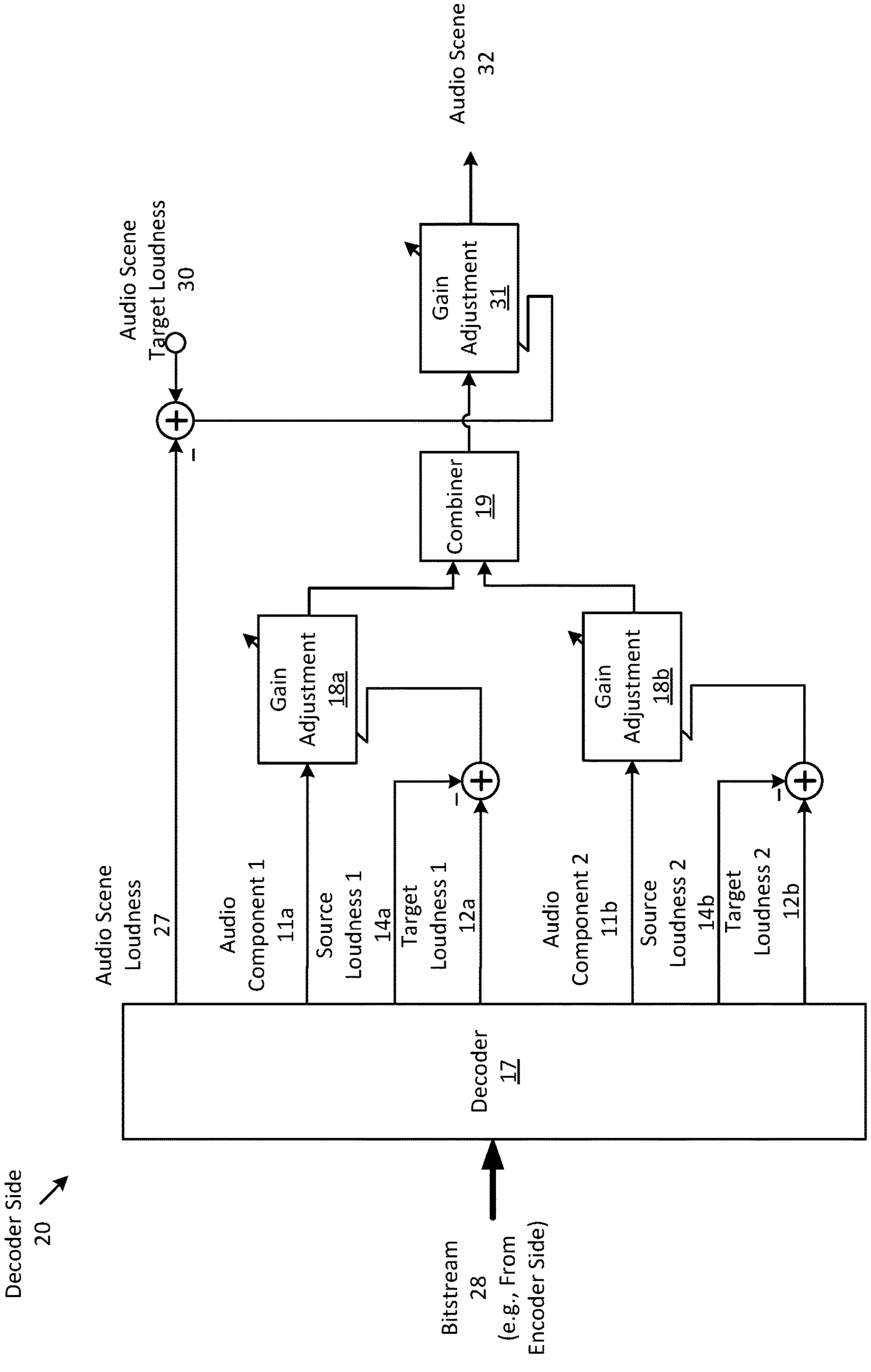
FIG. 6 is a block diagram of a decoder side that receives the bitstream and uses loudness metadata to adjust loudness of audio content during playback according to some aspects.

FIG. 5 is a block diagram of an encoder side 10 that produces a bitstream of encoded audio content and loudness metadata for adjusting loudness during playback of the audio content according to one aspect. This figure is showing operations performed at the encoder side for one or more audio components for an audio scene (of an audio program) that is being streamed to the decoder side, e.g., over the Internet, during playback of the audio content at the decoder side. In particular, the operations being performed are occurring in real-time as the audio components are being streamed to the decoder side for (e.g., immediate) playback. FIG. 6 is a block diagram of the decoder side 20 that receives the bitstream and uses loudness metadata to adjust loudness of audio content during playback according to some aspects.

As shown, these figures include several operational blocks that were included in (and described with respect to) FIG. 3, and several additional operational blocks. For example, FIG. 5 includes blocks 13*a*, 13*b*, and 15 from FIG. 3, and includes additional blocks, such as gain adjustments 25*a* and 25*b*, combiner 65, and loudness measurement 26. FIG. 6 includes blocks 17, 18*a*, 18*b*, and 19 from FIG. 3, and includes additional blocks, such as gain adjustment 31. For the sake of brevity, at least some of these operational blocks that were described in FIG. 3, such as loudness measurement 13*a* and 13*b*, gain adjustments 18*a* and 18*b*, and combiner 19 will not be described again.

Turning to FIG. 5, the additional blocks may allow the encoder side 10 to determine loudness metadata that describes the overall loudness of the audio scene to which the audio components 11*a* and 11*b* are associated. Specifically, the encoder side 10 may determine an audio scene loudness 27 of an audio scene that includes (at least) the audio components 11*a* and 11*b*. This loudness may be determined (computed or estimated) based on the source loudness and target loudness of at least one of the audio components of the audio scene. In one aspect, each gain adjustment 25 may be configured to adjust the gain of each respective audio component. Specifically, each gain adjustment may be configured to perform similar operations as gain adjustments 18*a* and 18*b* described in FIG. 3. For example, gain adjustment 25*a* may receive an audio signal of the audio component 11*a* and may apply a scalar gain based on a difference between the target loudness 12*a* and the source loudness 14*a* of the audio component 11*a*. In particular, the encoder side may determine the scalar gain based on the difference, with the encoder side adjusting a gain adjustment (e.g., gain adjustment 25*a*) accordingly. The gain adjustment 25*b* may perform similar operations with respect to the audio component 11*b*, the source loudness 14*b*, and the target loudness 12*b*, to produce a gain adjusted audio signal from the audio signal of the audio component 11*b*.

The combiner 65 may receive each of the gain-adjusted audio signals from the gain adjustments 25*a* and 25*b*, and may combine the signals into one or more signals. The loudness measurement 26 may determine the audio scene loudness 27 using the gain-adjusted audio signal(s) produced by the gain adjustments. In particular, the loudness measurement 26 may receive the combined signal(s) from the combiner 65, and may measure the loudness of the signal(s) as the audio scene loudness 27. In one aspect, the audio scene loudness 27 may be an average of the combined audio signals, which therefore provides a loudness level (e.g., an average loudness level) of the (e.g., portion of the) audio scene that is associated with the audio components 11*a* and 11*b*. In one aspect, the loudness 27 may be an average level of the combined audio signals. The encoder 15 may receive the loudness levels and the audio components, and produces a bitstream 28 with the encoded (audio signals of the) audio components 11*a* and 11*b*, and adds their respective source and target loudness levels and the audio scene loudness level 14*a*, 12*a*, 14*b*, 12*b*, and 27 as metadata into the bitstream, which is transmitted to the decoder side 20.

In one aspect, the operations described herein may be performed for live or real-time streaming of the audio program. As a result, as the encoder side transmits the audio components, it may update at least some of the measured loudness levels (e.g., in real-time), as described herein. For example, at least some of the loudness measurement blocks (e.g., 13*a*, 13*b*, and/or 26) may compute a measure of loudness for a given interval (one or more audio samples), and may periodically update at least some loudness levels that are being added into the bitstream 28 as metadata, while audio data of the audio components are being streamed.

Turning to FIG. 6, this figure shows a block diagram of the decoder side 20 that receives the bitstream 28 and uses loudness metadata to adjust loudness of audio content, which may be during audio playback, according to some aspects. As shown, the decoder side 20 receives the audio components 11*a* and 11*b*, and their respective loudness levels and target loudness levels through bitstream 28. The decoder may also receive the audio scene loudness level 27, which may define the overall audio scene loudness level associated with the audio scene of the received audio components. The gain adjustment 31 may be configured to receive the combined audio signal(s) from the combiner 19 and to adjust gain of the combined audio signal(s) by applying a scalar gain based on a difference between the audio scene loudness level and an audio scene target loudness level 30. In one aspect, the target loudness level 30 may be predefined (or user-defined), which may be stored in memory of the decoder-side device. In some aspects, the target loudness level 30 may be determined (chosen) by the decoder side based on a dynamic range and/or loudness headroom of the electronic device which is executing the decoder side 20 (e.g., the audio playback device, as described herein). In one aspect, the scalar gain that is applied by the gain adjustment 31 may normalize the loudness of the overall audio scene during playback to the audio scene target loudness level 30. As a result, the gain adjustment 31 may produce an audio scene 32 that has accurate loudness normalization with respect to the target loudness level 30.

Another aspect of the disclosure here is a way to add loudness metadata into a bitstream in compliance with a future Moving Picture Experts Group (MPEG) standard (e.g., MPEG-D DRC standard), which is extended herein to support loudness level payloads to be added at the encoder side for transmission to the decoder side for adjusting loudness, as described herein. The existing MPEG-D DRC standard (e.g., ISO/IEC, "Information technology—MPEG Audio Technologies—Part 4: Dynamic Range Control," ISO/IEC 23003-4:2020) defines loudnessInfoSet( ) payload which carries a loudnessInfo( ) payload that provides a loudness and peak of encoded audio data within a bitstream. The loudnessInfo( ) payload, however, is not structured to include other loudness levels of the audio data, such as the source loudness and target loudness levels described herein. Therefore, the present disclosure provides an enhancement to MPEG-D DRC that allows the audio codec system for encoding loudness levels within encoded bitstreams described herein as metadata.

FIGS. 7 and 8 show tables of enhancements to the bitstream syntax of MPEG-D DRC according to some aspects. Specifically, these figures are showing tables that includes syntax of payloads that replace payloads of the existing standard, where an encoder side creates and encodes metadata according to the enhanced syntax, while a decoder side extracts metadata from the enhanced MPEG-D DRC bitstream according to the enhanced syntax.

Turning to FIG. 7, this figure shows a Table 1 that includes syntax of a new loudnessInfoSetV8( ) payload for replacing loudnessInfoSet( ) of the existing standard. The new payload includes a loudnessInfoAlbumCount as an 8-bit data structure (or value) that defines a number of albums (e.g., a group of one or more musical compositions) associated with the encoded audio data of the bitstream, and includes a loudnessInfoTrackCount as an 8-bit data structure that defines a number of tracks (e.g., individual musical compositions). The loundnessInfoSetV8( ) includes loudnessInfoV8( ) payload which indicates loudness measurements for each album and/or track within the bitstream. For example, for each album, loudnessInfoV8( ) indicates an "album loudness" that measures the loudness for a whole album, while for each track, loudnessInfoV8( ) indicates a "track loudness" as an individual loudness of the track.

The loudnessInfoSetV8( ) payload also includes loudnessInfoOfSources( ) payload that may have metadata regarding the source loudness and/or target loudness of at least some encoded audio data (e.g., audio components) within the bitstream, as described herein. In particular, the loudnessInfoSetV8( ) includes a single bit that indicates whether one or more source loudness levels and/or one or more target loudness levels (e.g., associated with one or more audio components) are present within the bitstream. If so, this indicates that the bitstream includes a loudnessInfoOfSources( ) payload, which as described herein, may include source loudness levels and/or target loudness levels.

Turning to FIG. 8, this figure shows a Table 2 that includes syntax of loudnessInfoOfSources( ) payload, which may be added to the loudnessInfoSetV8( ) payload according to MPEG-D DRC standard, where loudnessInfoOfSources( ) includes the loudness metadata for one or more audio components, as described herein. In particular, this payload provides loudness levels for loudness normalization of each audio component separately. As described herein, the syntax fields include instructions for the decoder side to extract source loudness levels and target loudness levels for channel groups, which include one or more audio channels (or signals) that are encoded within the bitstream. In one aspect, each channel group may be associated with (or represent) at least one audio component. For example, a channel group may include one or more audio channels that make up an audio component. As another example, audio channels of a channel group may make up two or more audio components.

A description of the syntax is as follows. In particular, the decoder determines whether a flag has been defined to have a first value in the bitstream that indicates whether the bitstream has only one channel group, such as hasOneChannelGroupWithAllChannels==1. If this is the case, the decoder determines that the encoded audio channels contained within the bitstream are associated with one channel group. In one aspect, when the flag is the first value, this may indicate that the one channel group is associated with one audio component (e.g., of an audio scene). Otherwise, if there is more than one channel group, the decoder determines the number of channel groups within the bitstream from an 8-bit integer within the bitstream, defined as channelGroupCount.

For each channel group defined by channelGroupCount (8-bit) data structure, the decoder determines all channels associated with (a part of) that particular channel group. Specifically, the decoder determines whether the flag hasOneChannelGroupWithAllChannels has been defined to have a second value in the bitstream (e.g., hasOneChannelGroupWithAllChannels==0). If this is the case, for a channel group, the decoder counts the number of consecutive channels starting at startChannelIndex (e.g., a first channel being "0') that belong to the channel group. The decoder counts the number of consecutive channels starting at startChannelIndex which are in this channel group, by applying channelCount. The decoder determines whether there may be additional channels that belong to that channel group by determining whether the bitstream includes a flag that is defined to have a first value, such as moreClusters==1. Specifically, this flag indicates when at least some channels of a channel group are not consecutive channels (e.g., due to channels of a channel group not being encoded in consecutive order). If this is the case, the decoder determines any additional channels through using instructions additionalClusterCount. Again, with this cluster, the decoder counts the number of consecutive channels starting at startChannelIndex (the first channel of the cluster being "0") that belongs to the cluster, and counts the number of (e.g., consecutive) channels by applying channelCount. As a result, the decoder is configured to extract one or more audio channels (or signals) for each channel group associated with each encoded audio component.

In one aspect, each of the "channels" encoded within the bitstream may include at least one channel of a multi-channel signal, an audio signal of an audio object, or a signal component of audio data in HOA format. A "channel group" may include one or more scene components, as described herein.

For each channel group, the decoder determines whether source loudness is present by determining whether a flag has a high value (e.g., if(sourceLoudnessPresent=1) within the bitstream, and whether target loudness is present by determining whether another flag has a high value (e.g., if(productionLoaudnessTargetPresent=1). If so, the decoder extracts bsSourceLoaudness that includes the source loudness associated with the channel group, as an 8-bit integer, and extracts bsProductionLoudnessTarget that includes the target loudness associated with the channel, as another 8-bit integer.

As described herein, the bitstream metadata may include 8-bit integers that indicate source loudness and target loudness of a particular channel group, and thereby defining the levels as one or more audio components associated with a group. In some aspects, the bitstream metadata may include one or more loudness levels for each channel group.

In one aspect, the encoder side may produce the bitstream by converting loudness levels into 8-bit integers and encoding (storing) the integers into the bitstream as part of the loudness metadata. Specifically, the encoder side may encode both loudness values, such as source loudness and target loudness, by converting floating-point loudness values, for example measured in LKFS units based on ITU-R BS.1770 into the 8-bit integer value, such as:

$$bsLoudness=-(int)4*loudness$$

where bsLoudness is the 8-bit integer stored within the bitstream and loudness is the loudness value in LKFS units. The stored 8-bit integer is uimsbf (unsigned integer MSB first) format that represents a range of −63 to 0 LKFS with a step size of 0.25. In another aspect, the loudness value within the bitstream may be stored in any format.

As described herein, the encoder side described herein may be performed by an electronic device, such as the media content device 77, and the decoder side may be performed by another electronic device, such as the playback device 79. In another aspect, any device may perform encoder-side and/or decoder-side operations, as described herein. For example, the audio output device 70 may perform decoder-side operations. As another example, one device may perform encoder and decoder operations.

Figure 9:
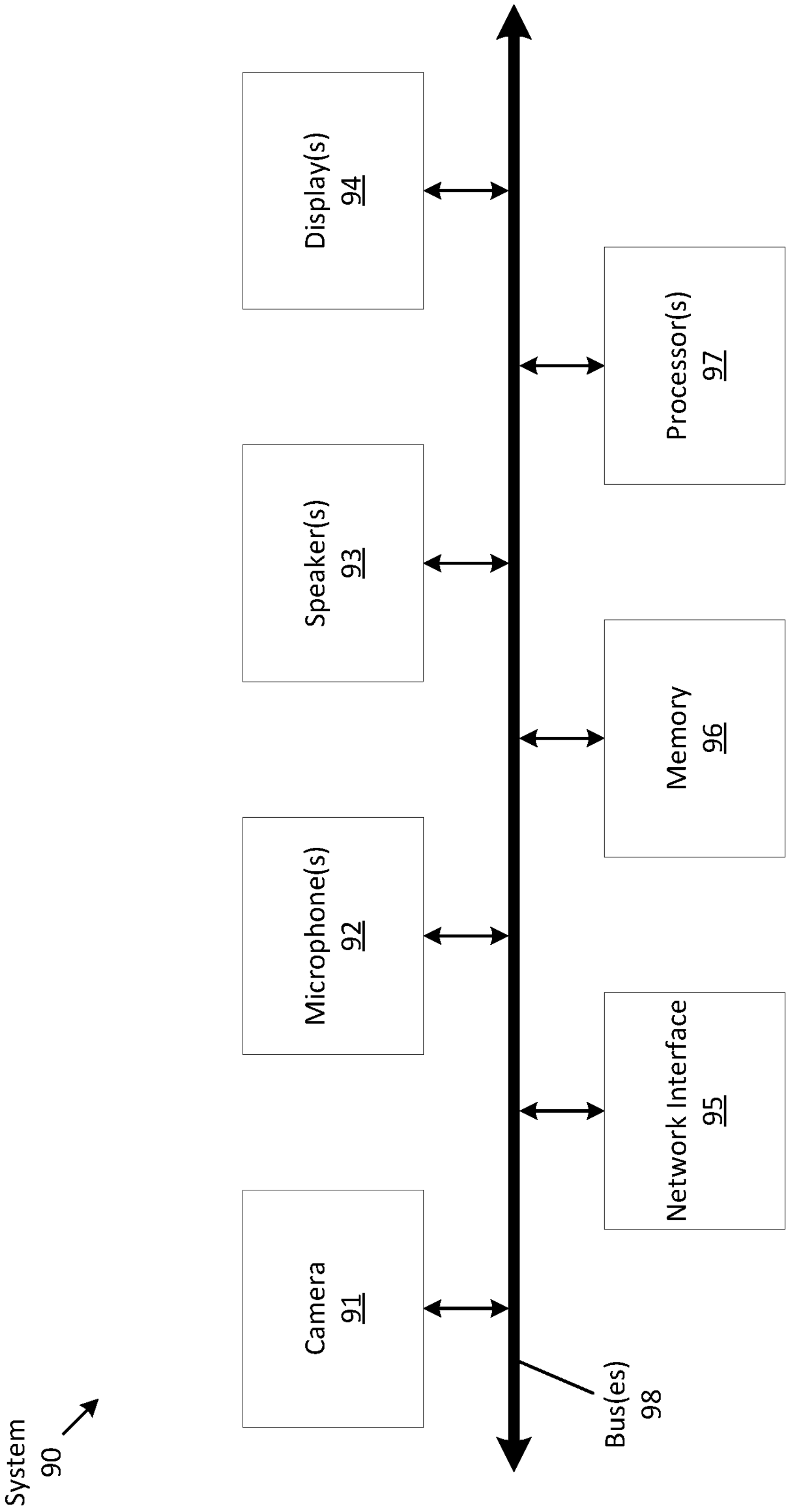
FIG. 9 illustrates an example of system hardware.

FIG. 9 shows a block diagram of audio processing system hardware, in one aspect, which may be used with any of the aspects described herein (e.g., media content device 77, playback device 79, or audio output device 70). This audio processing system can represent a general-purpose computer system or a special purpose computer system. Note that while FIG. 9 illustrates the various components of an audio processing system that may be incorporated into one or more of the devices described herein, it is merely one example of a particular implementation and is merely to illustrate the types of components that may be present in the audio processing system. FIG. 9 is not intended to represent any particular architecture or manner of interconnecting the components as such details are not germane to the aspects herein. It will also be appreciated that other types of audio processing systems that have fewer components than shown or more components than shown in FIG. 9 can also be used. Accordingly, the processes described herein are not limited to use with the hardware and software of FIG. 9.

As shown in FIG. 9, the audio processing system (or system) 90 (for example, a laptop computer, a desktop computer, a mobile phone, a smart phone, a tablet computer, a smart speaker, a head mounted display (HMD), a headphone set, or an infotainment system for an automobile or other vehicle) includes one or more buses 98 that serve to interconnect the various components of the system. One or more processors 97 are coupled to bus 98 as is known in the art. The processor(s) may be microprocessors or special purpose processors, system on chip (SOC), a central processing unit, a graphics processing unit, a processor created through an Application Specific Integrated Circuit (ASIC), or combinations thereof. Memory 96 can include Read Only Memory (ROM), volatile memory, and non-volatile memory, or combinations thereof, coupled to the bus using techniques known in the art. Camera 91, microphone(s) 92, speaker(s) 93, and display(s) 94 may be coupled to the bus.

Memory 96 can be connected to the bus and can include DRAM, a hard disk drive or a flash memory or a magnetic optical drive or magnetic memory or an optical drive or other types of memory systems that maintain data even after power is removed from the system. In one aspect, the processor 97 retrieves computer program instructions stored in a machine readable storage medium (memory) and executes those instructions to perform operations described herein.

Audio hardware, although not shown, can be coupled to the one or more buses 98 in order to receive audio signals to be processed and output by speakers 93. Audio hardware can include digital to analog and/or analog to digital converters. Audio hardware can also include audio amplifiers and filters. The audio hardware can also interface with microphones 92 (e.g., microphone arrays) to receive audio signals (whether analog or digital), digitize them if necessary, and communicate the signals to the bus 98.

The network interface 95 may communicate with one or more remote devices and networks. For example, interface can communicate over known technologies such as Wi-Fi, 3G, 4G, 5G, Bluetooth, ZigBee, or other equivalent technologies. The interface can include wired or wireless transmitters and receivers that can communicate (e.g., receive and transmit data) with networked devices such as servers (e.g., the cloud) and/or other devices such as remote speakers and remote microphones.

It will be appreciated that the aspects disclosed herein can utilize memory that is remote from the system, such as a network storage device which is coupled to the audio processing system through a network interface such as a modem or Ethernet interface. The buses 98 can be connected to each other through various bridges, controllers and/or adapters as is well known in the art. In one aspect, one or more network device(s) can be coupled to the bus 98. The network device(s) can be wired network devices (e.g., Ethernet) or wireless network devices (e.g., WI-FI, Bluetooth). In some aspects, various aspects described (e.g., loudness measurements, encoding, decoding, gain adjustments, signal combining, analysis, estimation, modeling, etc.,) can be performed by a networked server in communication with one or more electronic devices, such as the playback device 79.

In one aspect, an audio decoder apparatus described herein includes a processor, and memory having stored therein instructions that configure the processor to obtain a bitstream, the bitstream comprising: a plurality of encoded audio components of an audio scene; for each audio component of the plurality of audio components, a source loudness of the audio component that was determined by an audio encoder apparatus by performing a loudness measurement process upon an audio signal of the audio component; a target loudness of the audio component that was received by the audio encoder apparatus; and an audio scene loudness of the audio scene that was estimated by the audio encoder apparatus by performing the loudness measurement process upon a plurality of gain-adjusted audio signals, wherein each gain-adjusted audio signal was produced by the audio encoder apparatus for a respective audio component by applying a normalization gain based on the source loudness and target loudness of the respective audio component.

In one aspect, the encoder side may determine the source loudness by retrieving the source loudness from memory, where the source loudness may be an overall loudness that may span a length of an audio signal (e.g., a playtime of the audio content of the audio signal). In another aspect, determining the source loudness of an audio component may include applying an audio signal of the component to a loudness model. In some aspects, the encoder side may determine different target loudness's for different audio components, or may determine the same target loudness for one or more audio components.

In another aspect, the encoder side may produce a bitstream by converting both a source loudness and a target loudness into respective 8-bit integers and storing each of the 8-bit integers into the bitstream as part of encoded metadata. In another aspect, the bitstream may include an encoded audio signal with the metadata, where a signal level of the encoded audio signal may be the same as a signal level of the received audio signal. In one aspect, the target loudness may be a first target loudness, and the bitstream may be a first bitstream, where the encoder side may receive a second target loudness subsequent to receiving the first target loudness; and produce a second bitstream by encoding the audio signal and including new metadata that has the source loudness and the second target loudness. In another aspect, the second target loudness is received via a user input device. In one aspect, the audio component may include several audio signals to which the audio signal belongs, where the target loudness may be associated with at least one of the audio signals. In another aspect, the audio signals may be in a higher order ambisonics (HOA) format that represents the audio component within the audio scene.

Various aspects described herein may be embodied, at least in part, in software. That is, the techniques may be carried out in an audio processing system in response to its processor executing a sequence of instructions contained in a storage medium, such as a non-transitory machine-readable storage medium (e.g. DRAM or flash memory). In various aspects, hardwired circuitry may be used in combination with software instructions to implement the techniques described herein. Thus, the techniques are not limited to any specific combination of hardware circuitry and software, or to any particular source for the instructions executed by the audio processing system.

In the description, certain terminology is used to describe features of various aspects. For example, in certain situations, the terms "analyzer", "separator", "renderer", "estimator", "combiner", "synthesizer", "controller", "localizer", "spatializer", "component," "unit," "module," "logic", "extractor", "subtractor", "generator", "optimizer", "processor", "mixer", "detector", "canceler", "simulator" "gain adjustment", "loudness measurement", "encoder" and "decoder" are representative of hardware and/or software configured to perform one or more processes or functions. For instance, examples of "hardware" include, but are not limited or restricted to an integrated circuit such as a processor (e.g., a digital signal processor, microprocessor, application specific integrated circuit, a micro-controller, etc.). Thus, different combinations of hardware and/or software can be implemented to perform the processes or functions described by the above terms, as understood by one skilled in the art. Of course, the hardware may be alternatively implemented as a finite state machine or even combinatorial logic. An example of "software" includes executable code in the form of an application, an applet, a routine or even a series of instructions. As mentioned above, the software may be stored in any type of machine-readable medium.

Some portions of the preceding detailed descriptions have been presented in terms of algorithms and symbolic representations of operations on data bits within a computer memory. These algorithmic descriptions and representations are the ways used by those skilled in the audio processing arts to most effectively convey the substance of their work to others skilled in the art. An algorithm is here, and generally, conceived to be a self-consistent sequence of operations leading to a desired result. The operations are those requiring physical manipulations of physical quantities. It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of an audio processing system, or similar electronic device, that manipulates and transforms data represented as physical (electronic) quantities within the system's registers and memories into other data similarly represented as physical quantities within the system memories or registers or other such information storage, transmission or display devices.

The processes and blocks described herein are not limited to the specific examples described and are not limited to the specific orders used as examples herein. Rather, any of the processing blocks may be re-ordered, combined, or removed, performed in parallel or in serial, as necessary, to achieve the results set forth above. The processing blocks associated with implementing the audio processing system may be performed by one or more programmable processors executing one or more computer programs stored on a non-transitory computer readable storage medium to perform the functions of the system. All or part of the audio processing system may be implemented as, special purpose logic circuitry (e.g., an FPGA (field-programmable gate array) and/or an ASIC (application-specific integrated circuit)). All or part of the audio system may be implemented using electronic hardware circuitry that include electronic devices such as, for example, at least one of a processor, a memory, a programmable logic device or a logic gate. Further, processes can be implemented in any combination hardware devices and software components.

While certain aspects have been described and shown in the accompanying drawings, it is to be understood that such aspects are merely illustrative of and not restrictive on the broad invention, and the invention is not limited to the specific constructions and arrangements shown and described, since various other modifications may occur to those of ordinary skill in the art. The description is thus to be regarded as illustrative instead of limiting.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

As previously explained, an aspect of the disclosure may be a non-transitory machine-readable medium (such as microelectronic memory) having stored thereon instructions, which program one or more data processing components (generically referred to here as a "processor") to perform the encoding and decoding operations, network operations, and audio signal processing operations, as described herein. In other aspects, some of these operations might be performed by specific hardware components that contain hardwired logic. Those operations might alternatively be performed by any combination of programmed data processing components and fixed hardwired circuit components.

While certain aspects have been described and shown in the accompanying drawings, it is to be understood that such aspects are merely illustrative of and not restrictive on the broad disclosure, and that the disclosure is not limited to the specific constructions and arrangements shown and described, since various other modifications may occur to those of ordinary skill in the art. The description is thus to be regarded as illustrative instead of limiting.

In some aspects, this disclosure may include the language, for example, "at least one of [element A] and [element B]." This language may refer to one or more of the elements. For example, "at least one of A and B" may refer to "A," "B," or "A and B." Specifically, "at least one of A and B" may refer to "at least one of A and at least one of B," or "at least of either A or B." In some aspects, this disclosure may include the language, for example, "[element A], [element B], and/or [element C]." This language may refer to either of the elements or any combination thereof. For instance, "A, B, and/or C" may refer to "A," "B," "C," "A and B," "A and C," "B and C," or "A, B, and C."

What is claimed is:

1. A method performed by a programmed processor of an encoder side, the method comprising:
- receiving a first audio component associated with an audio scene, the first audio component comprising a first audio signal;
- receiving a second audio component associated with the audio scene, the second audio component comprising a second audio signal;
- determining a first source loudness of the first audio component based on the first audio signal;
- determining a second source loudness of the second audio component based on the second audio signal;
- receiving a first target loudness for the first audio component and a second target loudness for the second audio component;
- determining an audio scene loudness for the audio scene using at least the first source loudness of the first audio component and the first target loudness;
- producing a bitstream with the first audio component and the second audio component by encoding the first audio signal and the second audio signal and including metadata that has the first source loudness, the first target loudness, the second source loudness, the second target loudness, and the audio scene loudness; and
- transmitting the bitstream to an electronic device.

2. The method of claim 1, wherein the first audio signal is a portion of an entire audio signal that makes up the first audio component, wherein the first source loudness is an average loudness across the portion of the entire audio signal that is received.

3. The method of claim 2, wherein the portion is a first portion, wherein the method further comprises:
- receiving a second portion of the entire audio signal that is received after the first portion;
- determining a third source loudness based on the first portion and the second portion; and
- transmitting the third source loudness as metadata in the bitstream that includes an encoded second portion of the entire audio signal.

4. The method of claim 3, wherein the third source loudness converges closer or is equal to an overall loudness of the entire audio signal than the first source loudness.

5. The method of claim 1, wherein the first audio component and the second audio component are part of a live audio program that is received in real-time as the live audio program is recorded.

6. The method of claim 1, wherein determining the audio scene loudness comprises:
- determining a scalar gain based on a difference between the first target loudness and the first source loudness; and
- producing a gain-adjusted audio signal by applying the scalar gain to at least the first audio signal, wherein the audio scene loudness is determined using the gain-adjusted audio signal.

7. The method of claim 6, wherein the scalar gain is a first scalar gain, wherein the method further comprising:
- producing a first gain-adjusted audio signal by applying the first scalar gain to the first audio signal, wherein the first scalar gain is based on a first difference between the first target loudness and the first source loudness;
- producing a second gain-adjusted audio signal by applying a second scalar gain to the second audio signal, wherein the second scalar gain is based on a second difference between the second target loudness and the second source loudness;
- determining an audio scene loudness level for the audio scene based on the first gain-adjusted audio signal and the second gain-adjusted audio signal; and
- adding the audio scene loudness level to the metadata.

8. An audio encoder device comprising:
- at least one processor; and
- memory having stored therein instructions which when executed by the at least one processor causes the audio encoder device to:
  - receive a first audio component associated with an audio scene, the first audio component comprising a first audio signal;
  - receive a second audio component associated with the audio scene, the second audio component comprising a second audio signal;
  - determine a first source loudness of the first audio component based on the first audio signal;
  - determine a second source loudness of the second audio component based on the second audio signal;
  - receive a first target loudness for the first audio component and a second target loudness for the second audio component;
  - determine an audio scene loudness for the audio scene using at least the first source loudness of the first audio component and the first target loudness for the first audio component; and
  - encode the first audio component and the second audio component and metadata that comprises the first source loudness, the second source loudness, the first target loudness, the second target loudness, and the audio scene loudness into a bitstream for an electronic device.

9. The audio encoder device of claim 8, wherein determining the first source loudness comprises retrieving the first source loudness from the memory, wherein the first source loudness is an overall loudness that spans a duration of the first audio signal.

10. The audio encoder device of claim 8, wherein determining the first source loudness of the first audio component comprises applying the first audio signal to a loudness model.

11. The audio encoder device of claim 8, wherein encoding the metadata comprises converting each of the first source loudness, the second source loudness, the first target loudness, and the second target loudness into respective 8-bit integers and storing each of the respective 8-bit integers into the bitstream.

12. The audio encoder device of claim 8, wherein the bitstream comprises a first encoded audio signal of the first audio signal and a second encoded audio signal of the first audio signal with the metadata, wherein a first signal level of the first encoded audio signal is the same as a first corresponding signal level of the first audio signal of the received first audio component and a second signal level of the second encoded audio signal is the same as a second corresponding signal level of the second audio signal of the received second audio component.

13. A non-transitory machine-readable medium having instructions stored therein which when executed by at least one processor of a first electronic device causes the first electronic device to:

determine a first source loudness of a first audio component and a second source loudness of a second audio component associated with an audio scene, the first audio component comprising a first audio signal and the second audio component comprising a second audio signal;

receiving a first target loudness for the first audio component and a second target loudness for the second audio component;

determine an audio scene loudness for the audio scene using at least the first source loudness of the first audio component and the first target loudness;

produce a bitstream with the first audio component and the second audio component by encoding the first audio signal and the second audio signal and including metadata that has the first source loudness, the second source loudness, the first target loudness, the second target loudness, and the audio scene loudness; and transmit the bitstream to a second electronic device.

14. The non-transitory machine-readable medium of claim 13, wherein the first audio signal is a portion of an entire audio signal that makes up the first audio component, wherein the first source loudness is an average loudness across the portion of the entire audio signal.

15. The non-transitory machine-readable medium of claim 14, wherein the portion is a first portion, wherein the non-transitory machine-readable medium comprises further instructions to:

receive a second portion of the entire audio signal that is subsequent the first portion;

determine a third source loudness based on the first portion and the second portion; and transmit the third source loudness as metadata in the bitstream that includes an encoded second portion of the entire audio signal.

16. The non-transitory machine-readable medium of claim 15, wherein the third source loudness converges closer or is equal to an overall loudness of the entire audio signal than the first source loudness.

17. The non-transitory machine-readable medium of claim 13, wherein the instructions to produce the bitstream with the first audio component and the second audio component by encoding the first audio signal and the second audio signal and including metadata comprises instructions to convert each of the first source loudness, the second source loudness. the first target loudness, the second target loudness, and the audio scene loudness into respective 8-bit integers and storing each 8-bit integer into the bitstream.

18. The non-transitory machine-readable medium of claim 13, wherein the instructions to determine the audio scene loudness comprises instructions to:

determine a scalar gain based on a difference between the first target loudness and the first source loudness; and produce a gain-adjusted audio signal by applying the scalar gain to at least the first audio signal, wherein the audio scene loudness is determined using the gain-adjusted audio signal.

19. The non-transitory machine-readable medium of claim 18, wherein the scalar gain is a first scalar gain, wherein the non-transitory machine-readable medium comprises further instructions to:

produce a first gain-adjusted audio signal by applying the first scalar gain to the first audio signal, wherein the first scalar gain is based on a first difference between the first target loudness and the first source loudness;

produce a second gain-adjusted audio signal by applying a second scalar gain to the second audio signal, wherein the second scalar gain is based on a second difference between the second target loudness and the second source loudness;

determine an audio scene loudness level for the audio scene based on the first gain-adjusted audio signal and the second gain-adjusted audio signal; and add the audio scene loudness level to the metadata.

* * * * *